United States Patent [19]

Masuda

[11] Patent Number: 5,489,950
[45] Date of Patent: Feb. 6, 1996

[54] PROJECTION TYPE DISPLAY SYSTEM WITH LIGHT EMITTING ARRAYS AND SCANNING MIRROR

[75] Inventor: Tomohiko Masuda, Takatuki, Japan

[73] Assignee: Minolta Camera Kabushiki Kaisha, Osaka, Japan

[21] Appl. No.: 212,824

[22] Filed: Mar. 15, 1994

[30] Foreign Application Priority Data

Mar. 16, 1993 [JP] Japan .................................. 5-055283
Feb. 25, 1994 [JP] Japan .................................. 6-028281

[51] Int. Cl.⁶ .................................................. G02B 26/10
[52] U.S. Cl. ........................... 348/744; 348/750; 348/756; 348/802; 359/213; 359/223; 359/196; 345/30
[58] Field of Search ..................................... 348/744, 745, 348/746, 747, 750, 751, 755, 756, 757, 800, 801, 802, 803; 359/213, 214, 196, 197, 223; 345/8, 31, 83, 55

[56] References Cited

U.S. PATENT DOCUMENTS

4,934,773  6/1990  Becker .
5,150,205  9/1992  Um et al. .............................. 348/757
5,166,778  11/1992  Beamon .............................. 348/115 X
5,189,545  2/1993  Takata et al. .

FOREIGN PATENT DOCUMENTS

4-301630  10/1992  Japan .

*Primary Examiner*—Victor R. Kostak
*Assistant Examiner*—Nathan J. Flynn
*Attorney, Agent, or Firm*—Burns, Doane, Swecker & Mathis

[57] ABSTRACT

A red image light signal emitting array, a green image light signal emitting array and a blue image light signal emitting array are driven by separate drivers in accordance with one-line image data at a time. The light signals emitted from the arrays are processed by a light signal combining lens and then are incident to a scanning mirror. The scanning mirror vibrates within a specified range of scan angles at a specified frequency, and while the scanning mirror reciprocates once, one frame of two-dimensional image is formed on a projection surface. The scan angle of the scanning mirror is detected by a detector, and the detector sends a detection signal to a timing signal generating circuit. The timing signal generating circuit is stored with values specified for the respective drivers, and when the detector detects that the scan angle becomes one of the values, the timing signal generating circuit sends a timing signal to the corresponding driver.

40 Claims, 18 Drawing Sheets

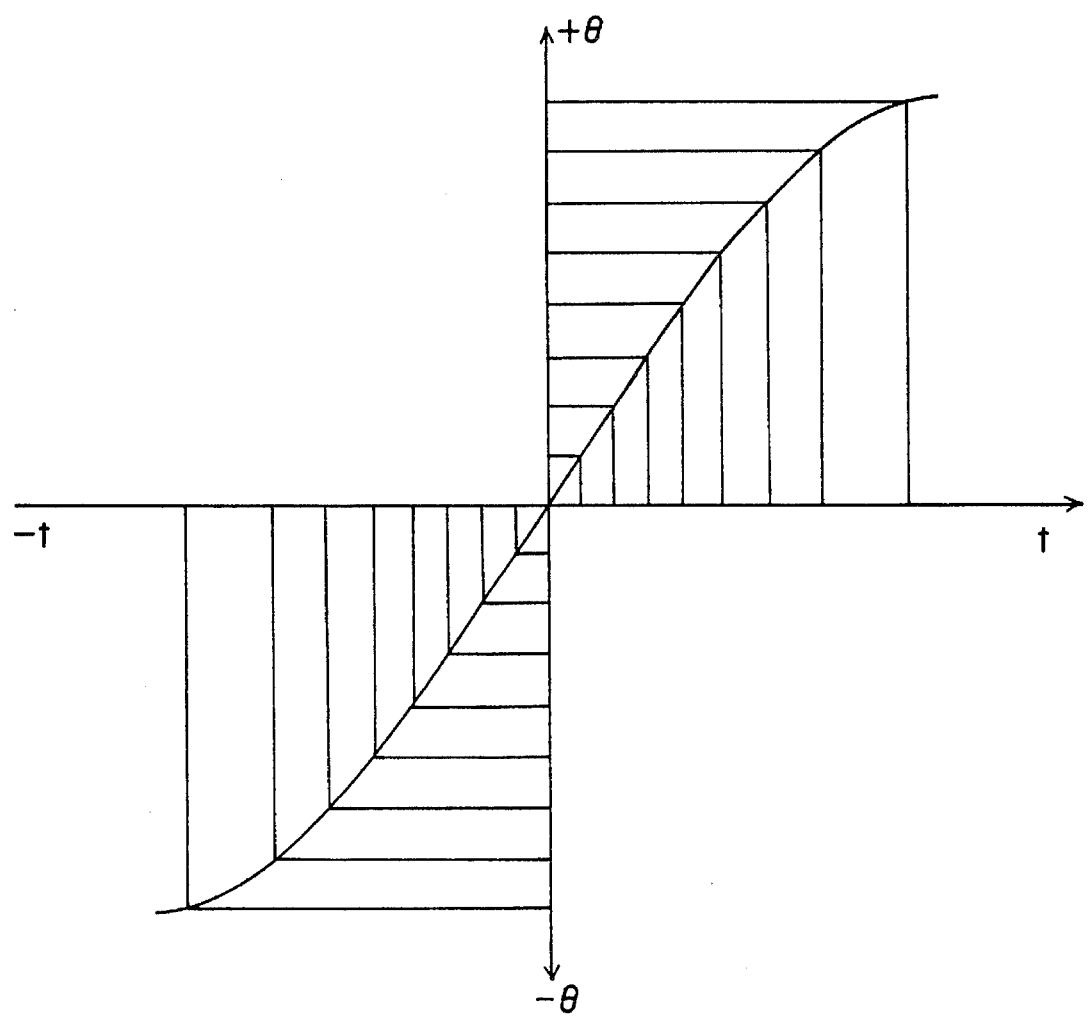
F I G. 11

F I G. 17
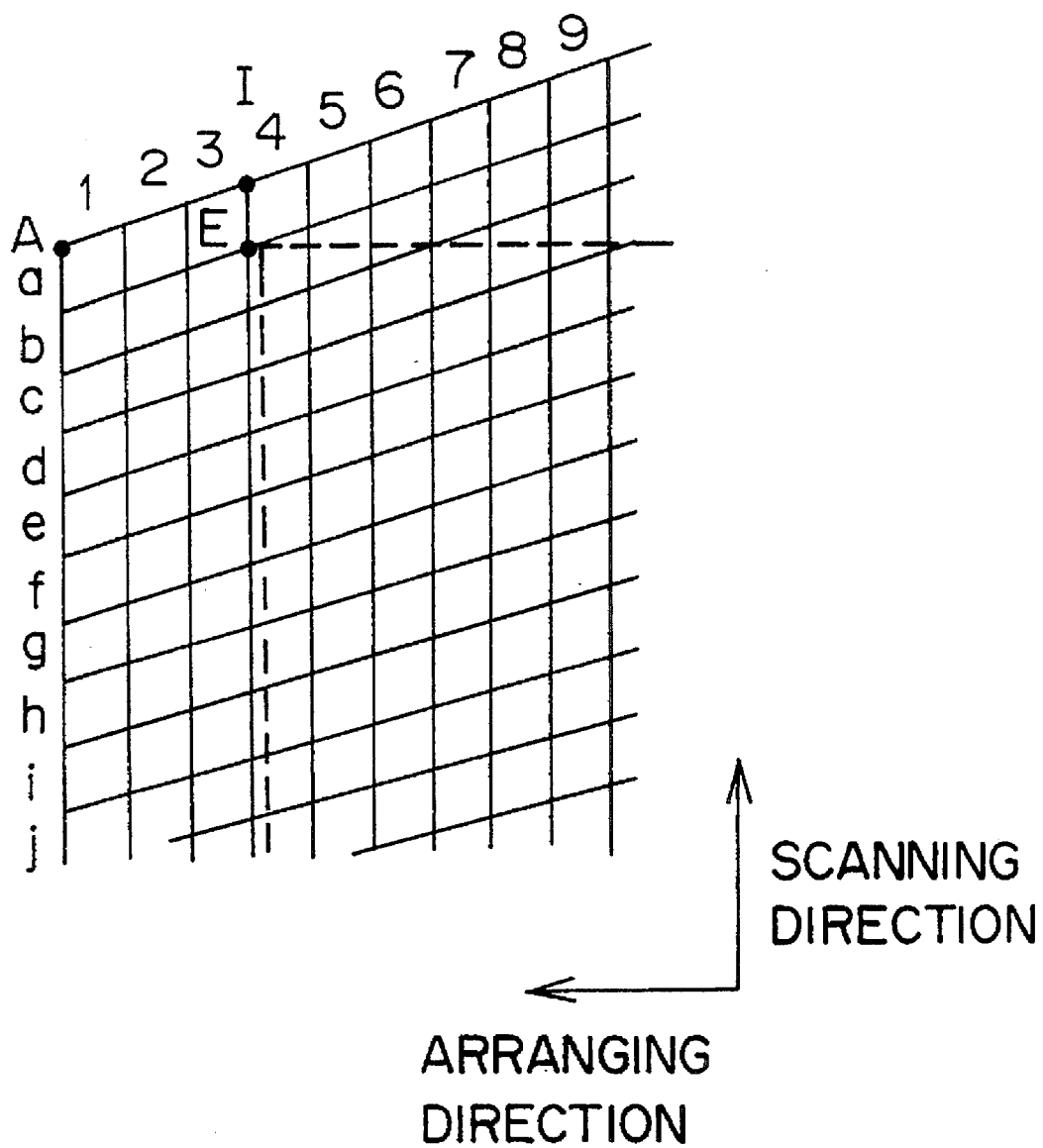
SCANNING DIRECTION
ARRANGING DIRECTION

PROJECTION TYPE DISPLAY SYSTEM WITH LIGHT EMITTING ARRAYS AND SCANNING MIRROR

BACKGROUND OF THE INVENTION

1. Field of the Invention

The present invention relates to a projection type display system, and more particularly to a projection type display system wherein a light signal emergent from a light shutter array, which has a row of light shutter elements, in accordance with image data is scanned by a scanning mirror to provide a two-dimensional image.

2. Description of Related Art

A well-known display system of a type which scans a linear light signal with a scanning mirror to provide a two-dimensional image is one disclosed by U.S. Pat. No. 4,934,773. The display system has a row of LEDs mounted on a circuit board. The LEDs are turned on and off individually in accordance with image data, and thus, a light signal is emitted From the LEDs. The light signal is incident to a single scanning mirror, and as the scanning mirror is vibrated, a two-dimensional image is viewed on a projection surface. The scanning mirror vibrates on a supporting point, and the vibrating frequency of the mirror is synchronized with the illuminating frequency of the LEDs. Thereby, a motion picture like a TV picture can be viewed.

However, in the display system, the LEDs emit lights of the same color, and it is impossible to form a full color image. In order to obtain a full color image, at least three kinds of light signal emitting means are necessary so that lights of the three primary colors can be emitted. Additionally, the lights of the three colors for each picture element must be projected on exactly the same spot on the projection surface.

SUMMARY OF THE INVENTION

The main object of the present invention is to provide a projection type display system which can project an image of high quality.

Another object of the present invention is to provide a projection type display system which can combine images on a projection surface accurately.

A further object of the present invention is to provide a projection type display system for projecting light signals emitted from a plurality of light emitting arrays on a projection surface, in which positioning of the light emitting arrays can be done easily.

In order to attain the objects, a projection type display system according to the present invention has a plurality of light signal emitting arrays, each of which has a row of light signal emitting elements, and the light signal emitting arrays are driven by a plurality of driving circuits provided therefor respectively at different specified drive frequencies. A linear light signal emitted from each of the light signal emitting arrays is scanned by a scanner which vibrates within a specified range of scan angles at a specified frequency, and a two-dimensional image is formed on a projection surface. The scan angle of the scanner is detected by a detector, and a controller sends start signals to the driving circuits separately based on detection of the detector. Each off the driving circuits starts driving the corresponding light signal emitting array on receiving the start signal.

In order to provide a full color two-dimensional image, three light signal emitting arrays are necessary such that light signals of the three primary colors can be emitted. Additionally, the light signals emitted from these light signal emitting arrays must be combined accurately on the scanner. The main cause of inaccurate combination of images is disagreement among optical paths from the respective light signal emitting arrays to the scanner. Therefore, the sends off the start signals to the respective driving circuits should be made with lags corresponding to the disagreement among the optical paths. Practically, the three light signal emitting arrays should start emission of light signals individually when the scanner comes to scan angles which are specified for the respective light signal emitting arrays in accordance with the disagreement among the optical paths.

Further, inaccurate combination of images is caused by misalignment among the light signal emitting arrays with respect to the direction in which the light signal emitting elements are lined and/or out-of-parallel of the light signal emitting arrays with one another. In such a case, inaccurate combination can be prevented by providing image data controllers for the respective driving circuits to rearrange image data, which determine individual drives of the light signal emitting elements, transmitted thereto.

BRIEF DESCRIPTION OF THE DRAWINGS

These and other objects and features of the present invention will be apparent from the following description with reference to the accompanying drawings, in which:

FIG. 11 is a graph showing relation between time and an incident angle to the eyes during image projection of one frame with correction;

FIG. 17 is an illustration explaining rearrangement of image data to prevent the inaccurate combination of images shown by FIG. 16;

DETAILED DESCRIPTION OF THE PREFERRED EMBODIMENTS

Preferred embodiments of the present invention are described with reference to the accompanying drawings.

Figure 1:
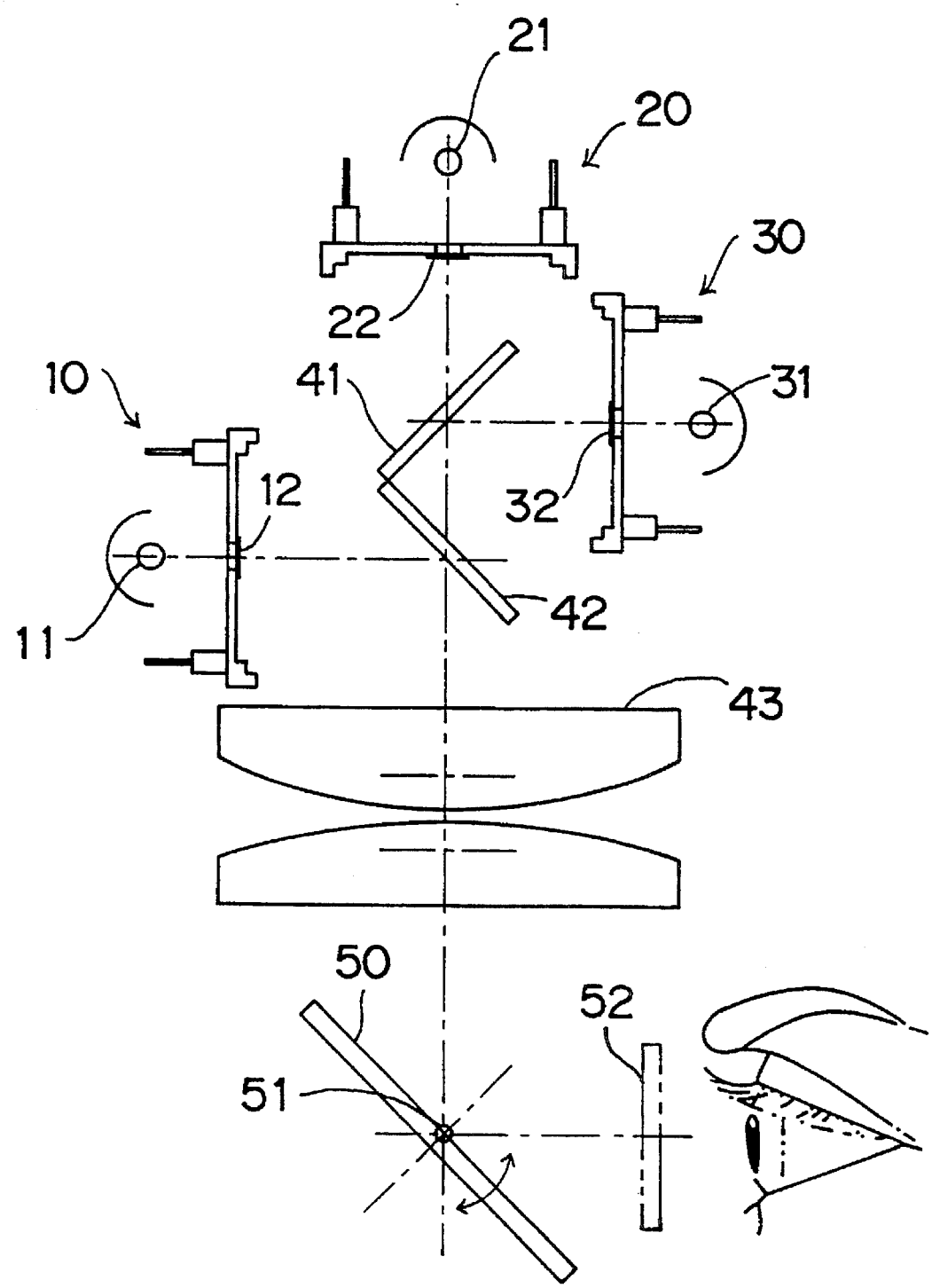
FIG. 1 is an elevational view of a first embodiment of the present invention.

FIG. 1 shows the general structure of a projection type display system which is a first embodiment.

In the first embodiment, optical heads 10, 20 and 30 emit light signals of the three primary colors, namely, red, green and blue, respectively, and these signals are combined on a scanning mirror 50 and scanned thereby such that a two-dimensional full color image can be viewed. Two dichroic mirrors 41 and 42 are disposed substantially in the center of the optical heads 10, 20 and 30. The light signals emitted from the optical heads 10, 20 and 30 are reflected by and/or pass through the dichroic mirrors 41 and 42, and pass through a magnifying lens 43. Then, the lights are scanned by the scanning mirror 50.

The optical heads 10, 20 and 30 comprise halogen lamps 11, 21 and 31, and light shutter arrays 12, 22 and 32 respectively. Each of the light shutter arrays 12, 22 and 32 comprises a row of light shutter elements made of PLZT, which has an electrooptic effect, and an analyzer and a polarizer disposed before and behind the row of light shutter elements. The light shutter elements are turned on and off individually in accordance with image data, and the elements, when they are turned on, transmit light.

Concerning a light emitted from the red optical head 10, only red rays are reflected by the dichroic mirror 42. Concerning a light emitted from the green optical head 20, only green rays pass through the dichroic mirrors 41 and 42. Concerning a light emitted from the blue optical head 30, only blue rays are reflected by the dichroic mirror 41 and pass through the dichroic mirror 42.

The scanning mirror 50 vibrates on a supporting point 51 in a direction indicated with an arrow within a specified range of scan angles at a specified frequency. The lights of the three primary colors, which carry one-line image data at a time, are reflected by and pass through the dichroic mirrors 41 and 42 as described above and further pass through the magnifying lens 48. Then, the lights are scanned by the mirror 50. The vibrating frequency of the scanning mirror 50 coincides with the illuminating frequency of the optical heads 10, 20 and 80. Thereby, an observer can see a two-dimensional full color image through an opening (not shown) made in front of the scanning mirror 50.

Figure 2:
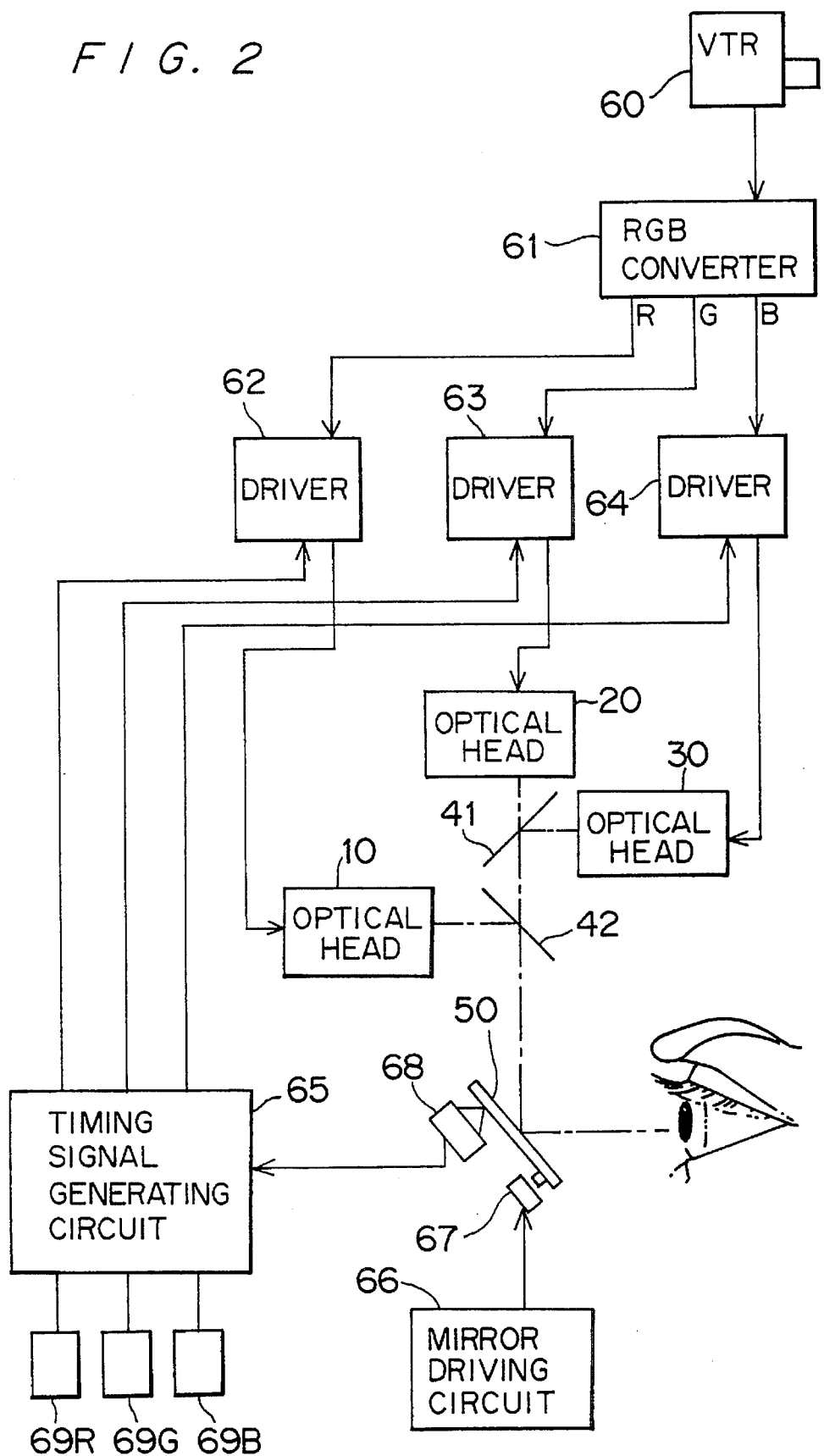
FIG. 2 is a block diagram of a control circuitry of the first embodiment.

FIG. 2 shows a control circuitry of the first embodiment. A video signal sent from a VTR 60 is converted into image data of three kinds, red, green and blue by an RGB converter 61. The red, the green and the blue image data are transmitted respectively to drivers 62, 68 and 64 which drive the optical heads 10, 20 and 80. Meanwhile, a timing signal generating circuit 65 generates a timing signal for timing the start of projecting one-frame image data and sends the signal to the drivers 62, 68 and 64. A mirror driving circuit 66 controls a mirror vibrating device 67 so as to vibrate the scanning mirror 50 at the specified frequency.

In FIG. 2, reference symbols 69R, 69G and 69B denote volumes for setting and adjusting the timing of transmitting the timing signal to the respective drivers 62, 63 and 64. These volumes 69R, 69G and 69B will be described later.

Figure 3:
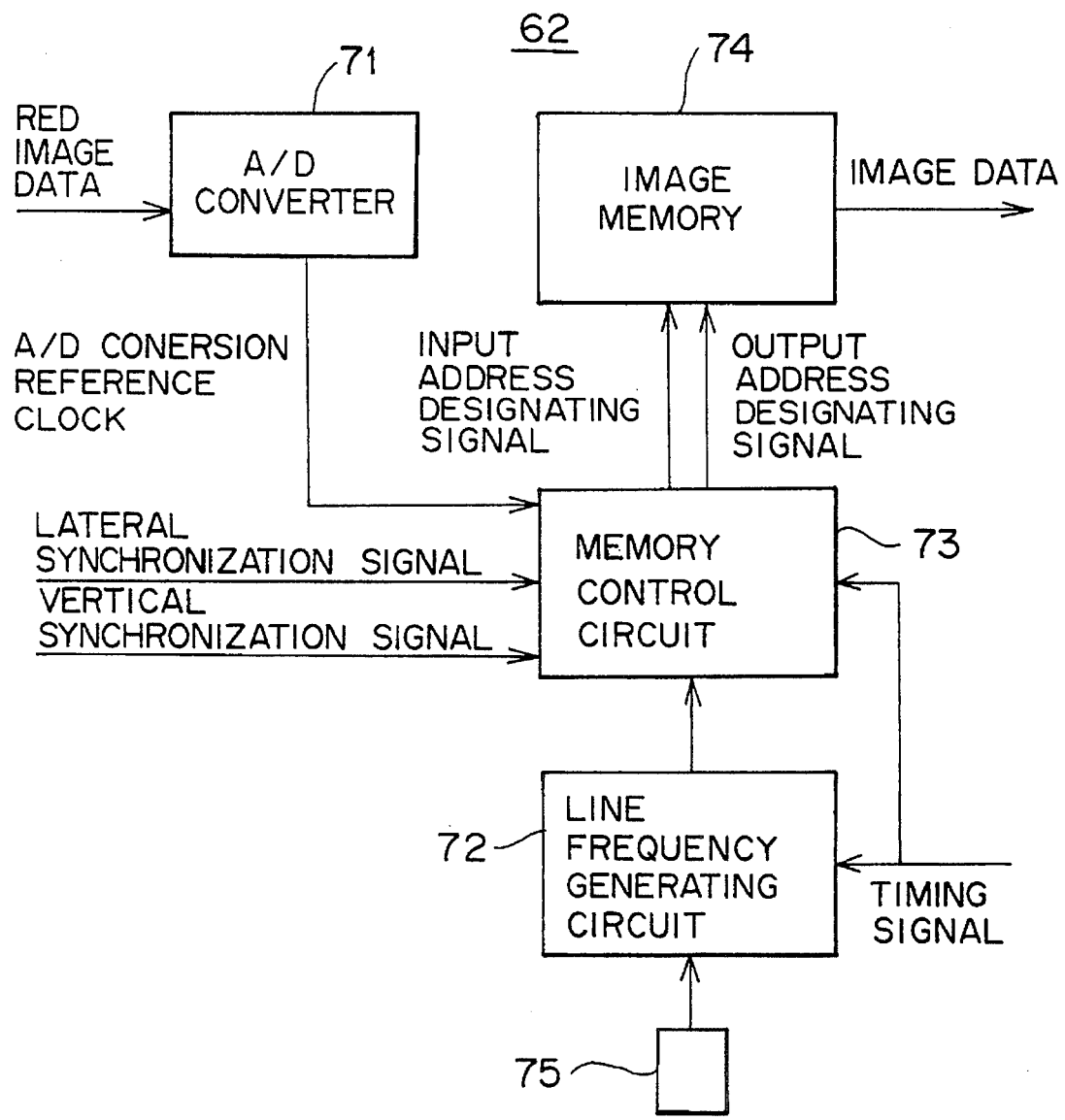
FIG. 3 is a block diagram showing the composition of a driver shown in FIG. 2.

FIG. 3 shows the composition of the red optical head driver 62, and the other drivers 63 and 64 each have similar composition. The red image data generated by the RGB converter 61 are converted into digital data by an A/D converter 71 and then, are stored in a memory control circuit 73. The memory control circuit 73 unfolds the red image data, and more particularly, rearranges the red image data in accordance with a predetermined parameter, if necessary, and transmits the rearranged image data to an image memory 74. The rearrangement of the image data will be described in more detail later. Additionally, the memory control circuit 73 receives a lateral synchronization signal and a vertical synchronization signal from the VTR 60, and these signals are used for the unfolding of the red image data.

Meanwhile, the timing signal sent from the timing signal generating circuit 65 is received by a line frequency generating circuit 72 and the memory control circuit 73. The line frequency generating circuit 72 generates a drive pulse signal for driving the light shutter array 12. In the line frequency generating circuit 72, a time required for scanning of one-frame image data (clock frequency) is set, and the drive pulse signal is generated in accordance with the clock frequency. The drive pulse signal has irregular wavelengths (time "t" in FIG. 11) such that compression of an image will not occur in edge portions with respect to the scanning direction.

Further, a volume 75 for adjusting the clock frequency is provided in the line frequency generating circuit 72. The volume 75 will be described in detail later.

If the optical heads 10, 20 and 30 are positioned with extremely high accuracy, the illumination of the optical heads 10, 20 and 30 can be controlled simultaneously. In this case, the circuitry may act as follows: the timing signal generating circuit 65 sends the timing signal to the drivers 62, 63 and 64 at the same time, and accordingly, the optical heads 10, 20 and 30 start emitting light signals simultaneously.

Practically, however, it is extremely difficult to position the optical heads 10, 20 and 30 with high accuracy. The following describes a case wherein the optical heads 10, 20 and 30 are out of position, that is, a case wherein the optical paths of the light signals of the three colors after the dichroic mirrors 41 and 42 are different, and how to prevent possible problems caused thereby.

Figure 4:
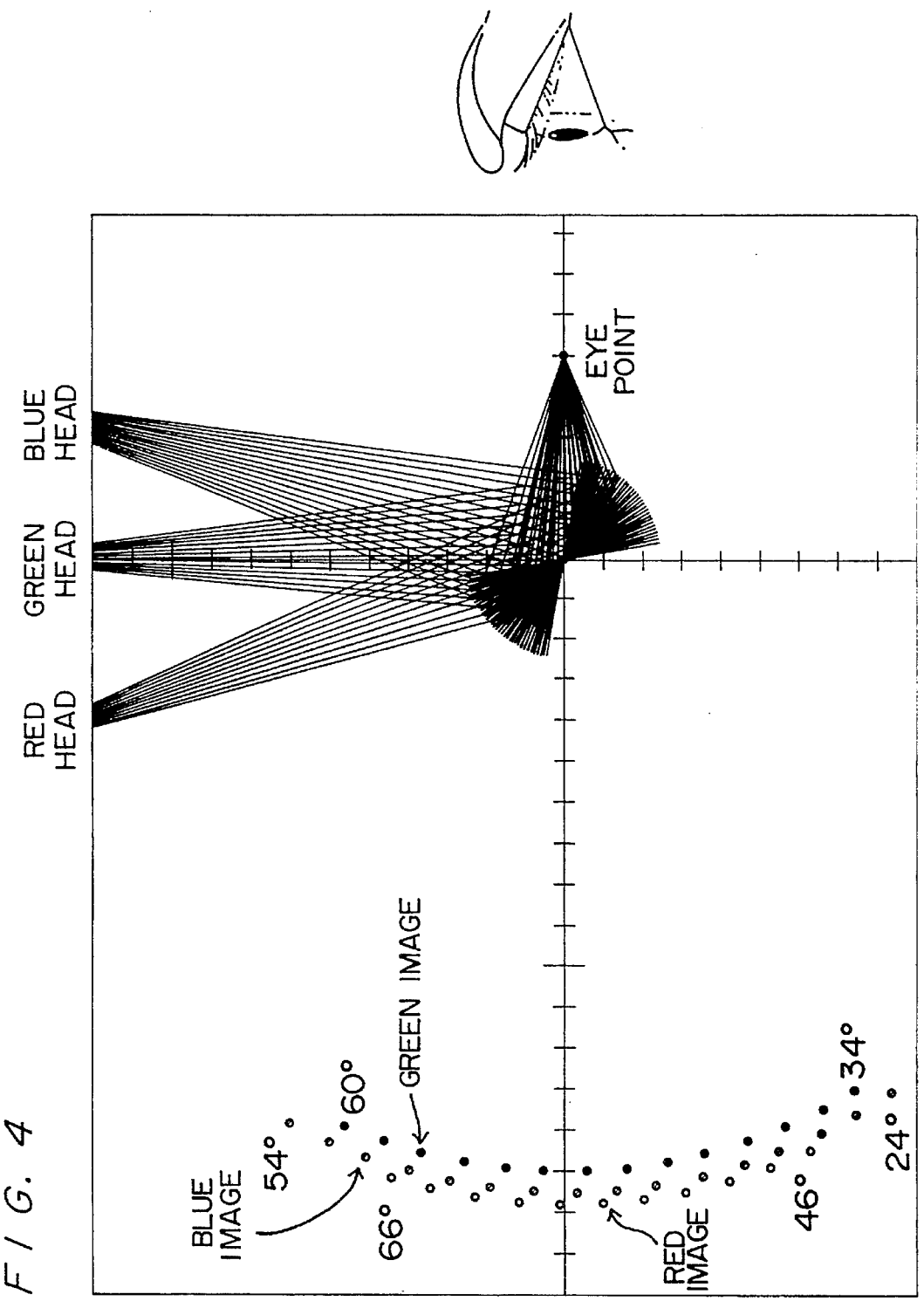
FIG. 4 is a graph showing inaccurate combination of images of the three primary colors in a case wherein optical paths of lights of the three primary colors are different.

FIG. 4 is a simulation of a two-dimensional image which will be seen when the optical paths of the light signals of the three colors are different. In FIG. 4, each dot indicates a picture element, and numerals provided by the side of some dots denote the scan angles of the scanning mirror 50. Concerning a red image, while the scanning mirror 50 vibrates through angles of 46 degrees to 66 degrees, the picture elements are seen as indicated with the dots in FIG. 4. Concerning a blue image, while the scanning mirror 50 vibrates through angles of 24 degrees to 54 degrees, the picture elements are seen as indicated with the dots in FIG. 4. Concerning a green image, while the scanning mirror 50 vibrates through angles of 34 degrees to 60 degrees, the picture elements are seen as indicated with the dots in FIG. 4.

Figure 5:
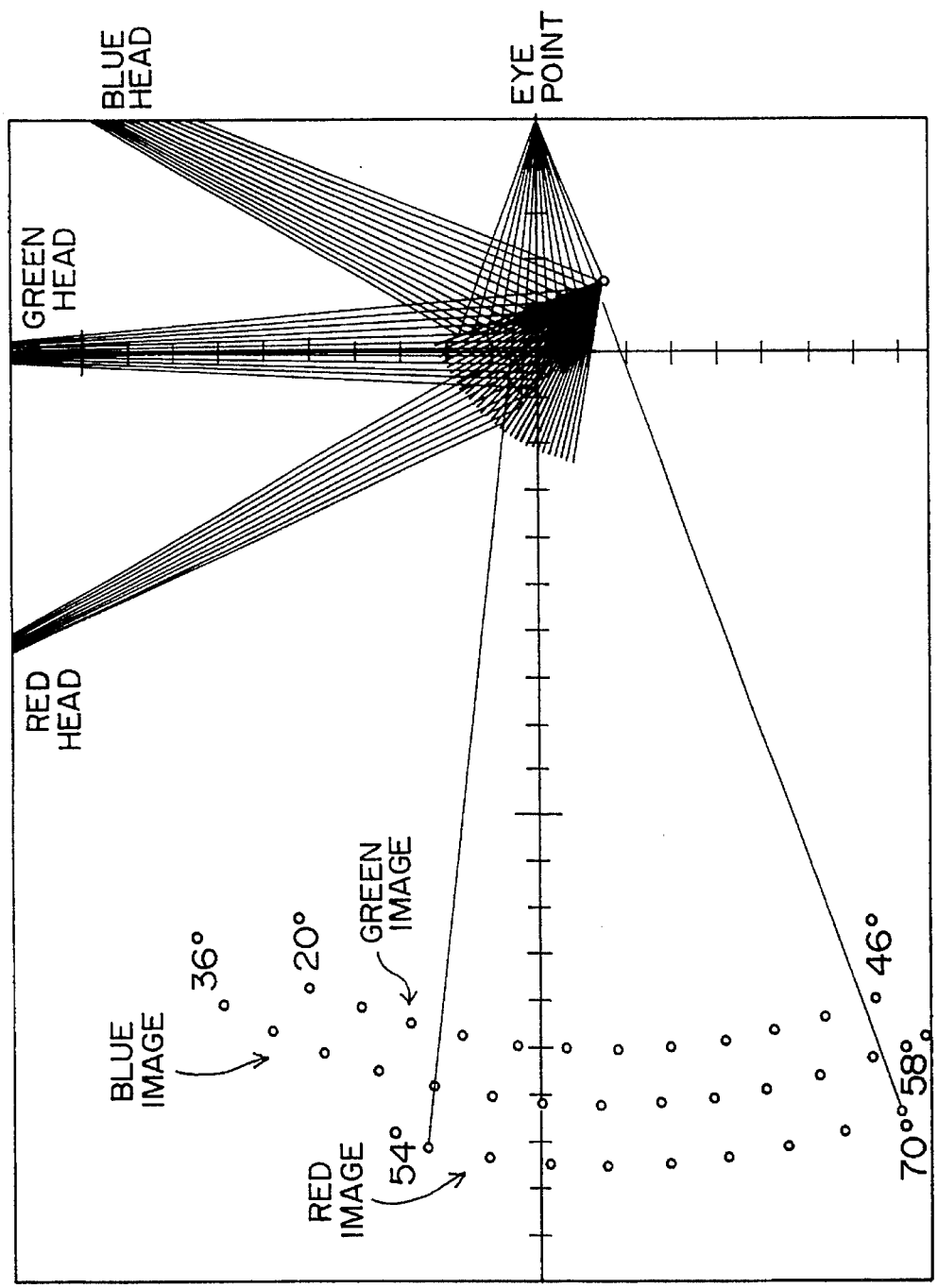
FIG. 5 is a graph showing inaccurate combination of images of the three primary colors in another case wherein optical paths off lights of the three primary colors are different.

FIG. 5 is a simulation of a two-dimensional image which will be seen when the optical paths of the light signals of the three colors are considerably different and the scanning mirror 50 repeats vibrating on an edge thereof as the supporting point. Concerning a red image, while the scanning mirror 50 vibrates through angles of 54 degrees to 70 degrees, the picture elements are seen as indicated with the dots in FIG. 5. Concerning a blue image, while the scanning mirror 50 vibrates through angles of 36 degrees to 58 degrees, the picture elements are seen as indicated with the dots in FIG. 5. Concerning a green image, while the scanning mirror 50 vibrates through angles of 20 degrees to 46 degrees, the picture elements are seen as indicated with the dots in FIG. 5.

Figure 6:
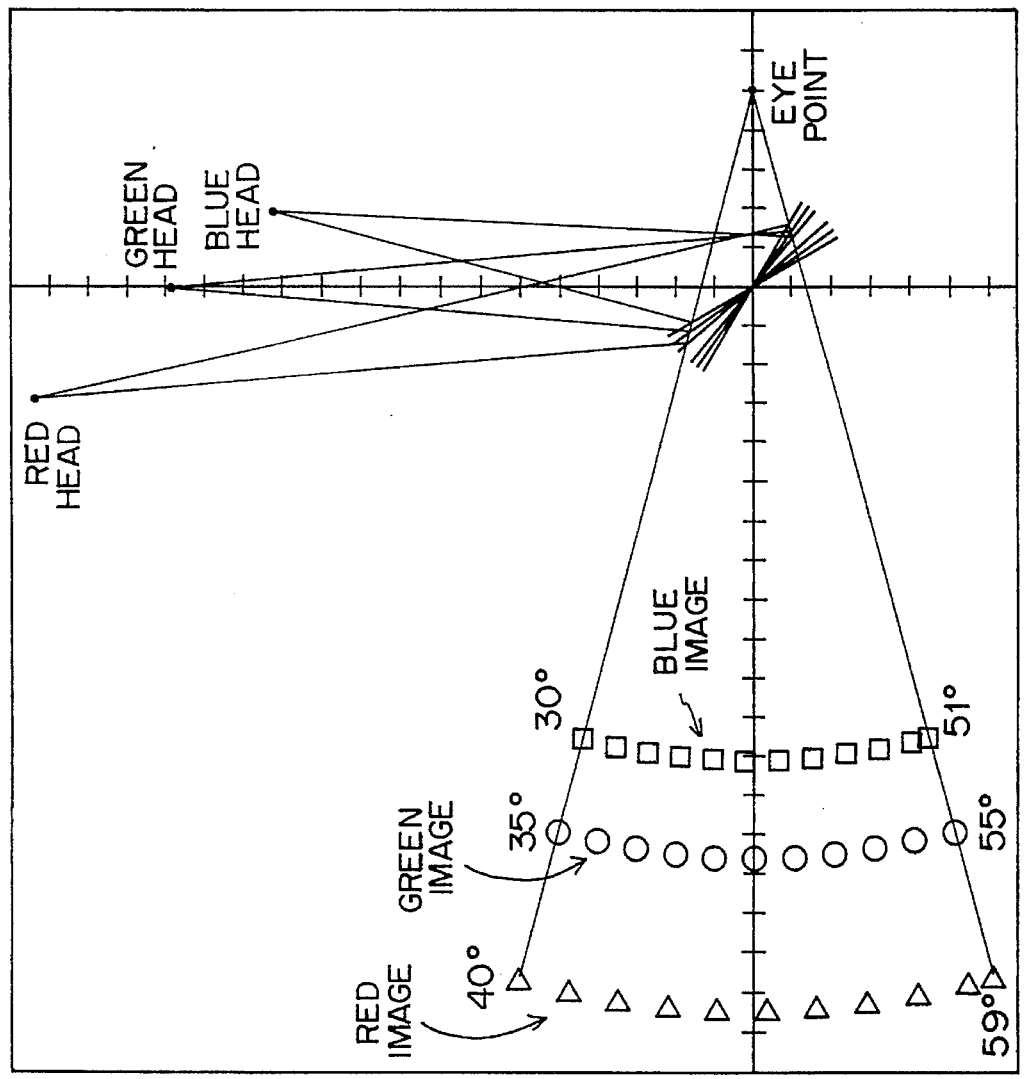
FIG. 6 is a graph showing inaccurate combination of images of the three primary colors in another case wherein optical paths off lights of the three primary colors are different.

FIG. 6 is a simulation of a two-dimensional image which will be seen when the optical paths of the light signals off the three colors are considerably different. Concerning a red image, while the scanning mirror 50 vibrates through angles of 40 degrees to 59 degrees, the picture elements are seen as indicated with the dots in FIG. 6. Concerning a green image, while the scanning mirror 50 vibrates through angles of 35 degrees to 55 degrees, the picture elements are seen as indicated with the dots in FIG. 6. Concerning a blue image, while the scanning mirror 50 vibrates through angles of 30 degrees to 51 degrees, the picture elements are seen as indicated with the dots in FIG. 6.

If the timing signal is sent to the drivers 62, 63 and 64 at the same time, all the optical heads 10, 20 and 30 will emit light signals for the same line at the same scan angle of the scanning mirror 50. In the cases of FIGS. 4, 5 and 6, the light signals of the three colors for the same line will be projected on different places, and consequently, two-dimensional images of the three colors are not combined accurately. Therefore, the timing signal generating circuit 65 is required to send the timing signal to the drivers 62, 63 and 64 separately with lags corresponding to the difference of the optical paths. In the case of FIG. 4, the timing signal must be sent to the drivers 62, 63 and 64 separately such that the red optical head 10 will emit the light signal For one frame while the scanning mirror 50 is vibrating within 20 degrees through scan angles of 46.0 to 66.0 degrees, such that the blue optical head 30 will emit the light signal for one frame while the scanning mirror 50 is vibrating within 19.3 degrees through scan angles of 28.8 to 48.1 degrees and such that the green optical head 20 will emit the light signal for one frame while the scanning mirror 50 is vibrating within 19.6 degrees through scan angles of 37.7 to 57.3 degrees. Thus, the scans of the respective color light signals for one frame must be not only started at different timings but also completed within different periods.

In the first embodiment, a scan angle detector 68 is provided on the scanning mirror 50, and result of the detection is sent to the timing signal generating circuit 65. As mentioned, the timing signal generating circuit 65 is provided with the volumes 69R, 69G and 693 such that the scan angles of the scanning mirror 50 at which the respective optical heads 10, 20 and 30 should start emitting the light signals can be set. When the value detected by the detector 68 comes to agree with one of the scan angles set by the volumes 69R, 696 and 693, the circuit 65 sends the timing signal to the corresponding driver 62, 63 or 64. In the ease of FIG. 4, the scan angles are set to 46.0, 37.7 and 28.8 respectively by use of the volumes 69R, 69G and 693 such that the timing signal will be sent to the red optical head driver 62 when the scanning mirror 50 comes to a scan angle of 46.0 degrees, such that the timing signal will be sent to the green optical head driver 63 when the scanning mirror 50 comes to a scan angle of 37.7 degrees and such that the timing signal is sent to the blue optical head driver 64 when the scanning mirror 50 comes to a scan angle of 28.8 degrees. Because of this structure of the timing signal generating circuit 65, even though the optical heads 10, 20 and 30 are not accurately positioned, formation of one-frame two-dimensional images of the three colors can be started in the same place on the projection surface.

Further, as mentioned, the red optical head driver 62 is provided with the volume 75 such that the clock frequency of a red image can be adjusted. The projection of one-frame red image data is carried out within the period set by use of the volume 75. In other words, the length of the projected red image in the main scanning direction can be adjusted by use of the volume 75. The green optical head driver 63 and the blue optical head driver 64 are each provided with a volume, and the clock frequency of a green image and the clock frequency of a blue image are adjusted such that the red image, the green image and the blue image will be combined exactly one upon another on the projection surface. In the case of FIG. 4, the clock frequencies are set such that the red optical head 10 will carry out the projection of one-frame red image data during a 20-degree vibration of the scanning mirror 50, such that the green optical head 20 will carry out the projection of one-frame green image data during a 19.6-degree vibration of the scanning mirror 50 and such that the blue optical head 30 will carry out the projection of one-frame blue image data during a 19.3-degree vibration of the scanning mirror 50.

Figure 7:
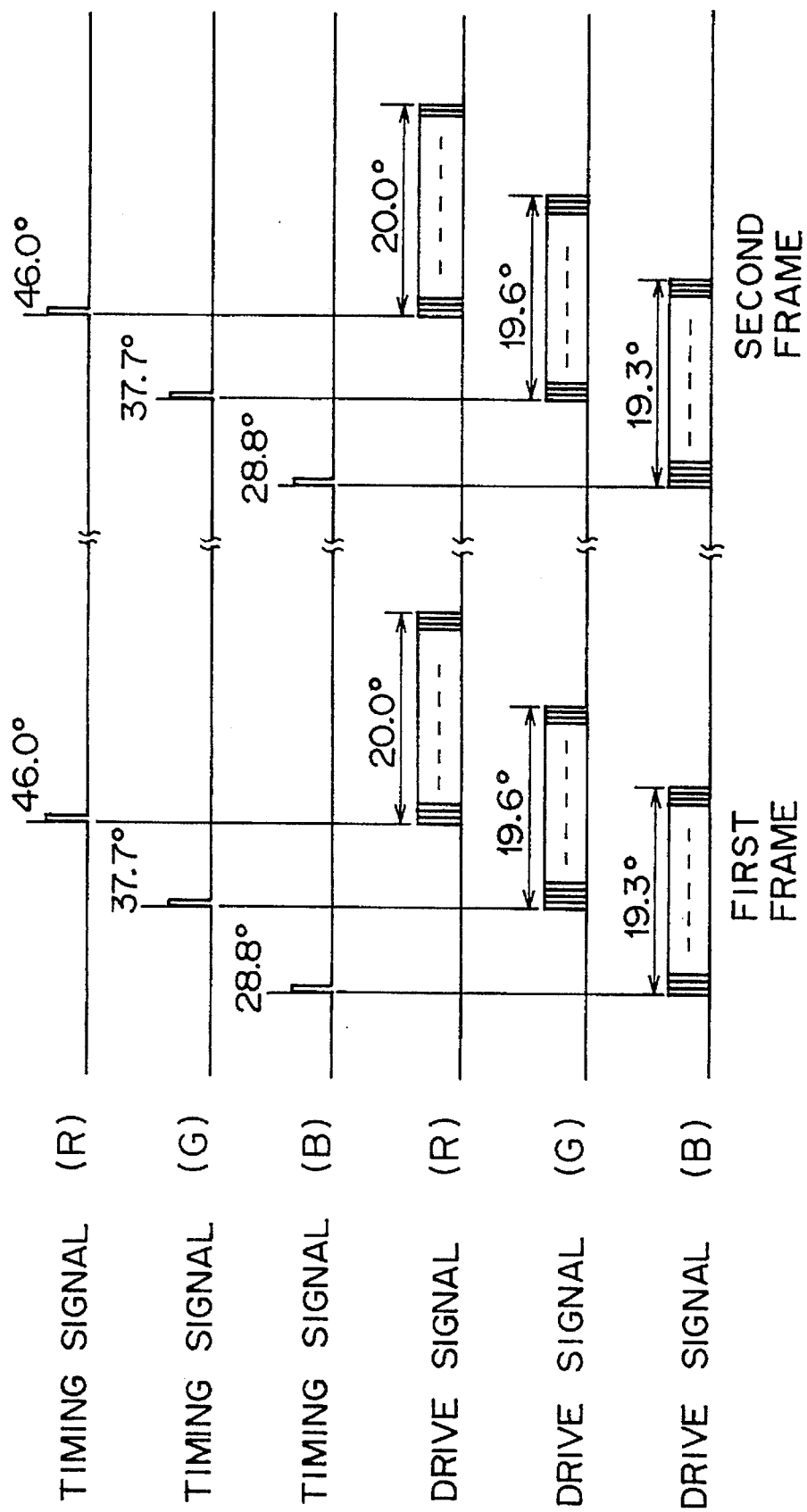
FIG. 7 is a time chart showing an example of action timing of the drivers of optical heads.

FIG. 7 is a time chart which shows action timing of the drivers 62, 63 and 64 in the case of FIG. 4.

When the scan angle of the scanning mirror 50 is detected by the scan angle detector 68 to become either one of the values set by the volumes 69R, 69G and 69B, the timing signal generating circuit 65 sends the timing signal to the corresponding driver 62, 63 or 64. More specifically, the timing signal is sent to the red optical head driver 62, the green optical head driver 63 and the blue optical head driver 64 when the scan angle becomes 46.0 degrees, 37.7 degrees and 28.8 degrees respectively. The line frequency generating circuits of the drivers 62, 63 and 64 start emitting the drive signal individually when they receive the timing signal. As can be seen in FIG. 7, the line frequency generating circuits send the drive signal to the respective drivers such that the respective optical heads 10, 20 and 30 will carry out the projection of one-frame image data during the clock frequencies set by the respective volumes. For example, in the case of FIG. 4, the line frequency generating circuit 72 sends the drive signal to the driver 62 such that the red optical head 10 will carry out the projection of one-frame red image data during a 20.0-degree vibration of the scanning mirror 50.

After reciprocating for a scan of one frame, the scanning mirror 50 starts vibrating for a scan of the next one frame. Then, when the scan angle of the scanning mirror 50 becomes either one of the values set by the volumes 69R, 69G and 69B again, the timing signal generating circuit 65 sends the timing signal to the corresponding driver 62, 63 and 64.

The drivers 62, 63 and 64 repeat the above-described action, and therefore the red, green and blue images are combined exactly one upon another on the projection surface.

Incidentally, as the magnifying lens 43, conventionally, an expensive rectifying lens (a lens for rectifying disagreement of image points of the respective colors) needs to be used. Otherwise, because of chromatic aberration of the magnifying lens 43, images of different colors will be magnified at different ratios, whereby the images of the three primary colors will be combined inaccurately and will be projected at different distances from the eyes of the observer (disagreement of image surfaces). The disagreement of image surfaces is not a significant problem because the observer hardly notices the disagreement of image surfaces. On the other hand, the inaccurate combination of three color images is a critical problem to a display system.

In the light of the problem, in the system of FIG. 1, the following setting of the optical heads 10, 20 and 80 is effective: the green optical head 20 is fixed, whereas the red optical head 10 and the blue optical head 30 are movable along the optical axis in the direction indicated with an alternate long and short dash line in FIG. 1. In the structure, the positions of the red optical head 10 and the blue optical head 30 are adjusted such that a red image and a blue image will have an equal or the closest magnification ratio to that of a green image. With the adjustment, combination of color images can be made accurately even though the expensive rectifying lens is not used.

Next, the frequency of the drive signal while the optical heads 10, 20 and 30 are projecting one-frame image data is described.

Figure 9:
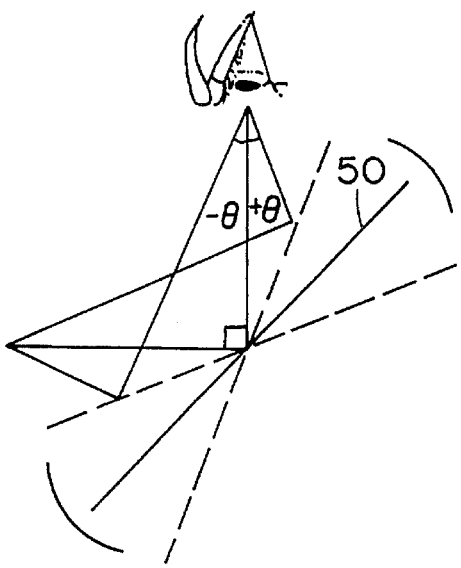
FIG. 9 is an illustration explaining relation between a scan angle of a scanning mirror and an incident angle to the eyes.
Figure 10:
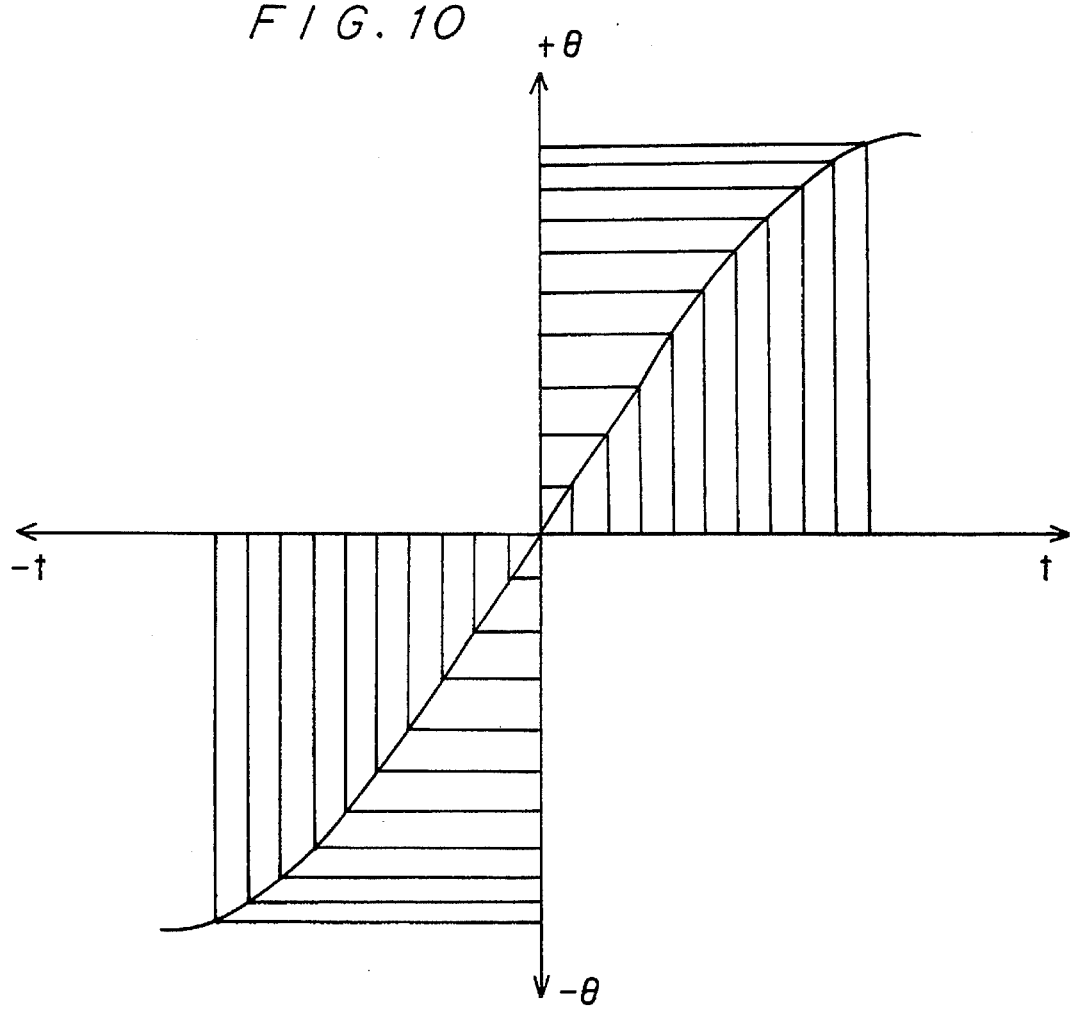
FIG. 10 is a graph showing relation between time and an incident angle to the eyes during image projection of one frame with no correction.

Suppose that the angle at which a light is incident to the eyes is θ (see FIG. 9). As shown in FIGS. 10 and 11, the drive signal is sinusoidal regarding the relation between the incident angle θ and the time t. If the drive signal for projection of one frame is a periodic pulse train, change of the incident angle θ, as shown in FIG. 10, is irregular. In this case, practically, both edge portions of the two-dimensional image with respect to the scanning direction are seen compressed. A way of preventing the compression of the image is generating the drive signal as an irregular pulse train as shown in FIG. 11 such that the incident angle θ will change regularly.

In this way, the compression of the image at both edge portions can be prevented. However, the scanning mirror 50 vibrates keeping a sinusoidal relation between the incident angle θ and the time t. If the optical heads 10, 20 and 30 generate light signals with a constant intensity regardless of the scan angle of the scanning mirror 50, each color image will have bright areas at both edge portions and a dark area in the center portion. The uneven brightness occurs whether the drive signal is a periodic pulse train or an irregular pulse train. The followings are exemplary ways of evening the brightness of the image.

Figure 12:
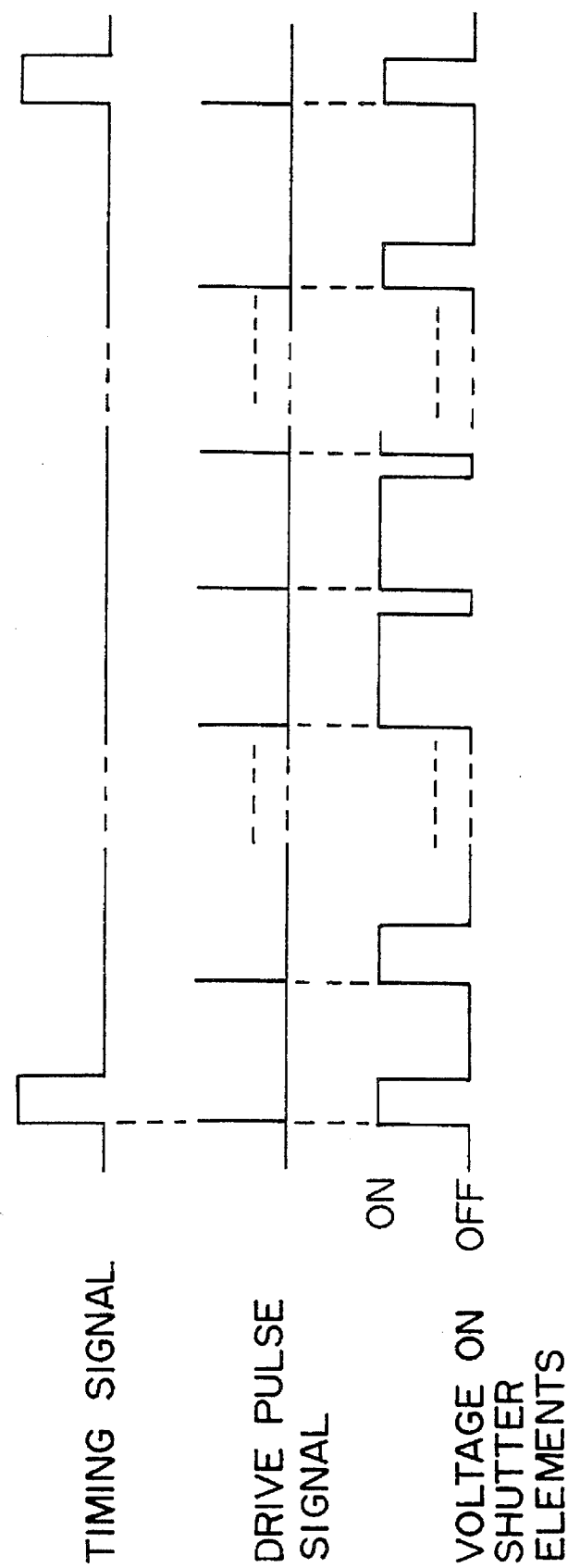
FIG. 12 is a time chart showing action timing of the optical heads in order to form an image with even brightness.

A First exemplary way is varying the illuminating time of each of the optical heads 10, 20 and 30 in response to a pulse of the drive signal depending on the portion with respect to the scanning direction of the scanning mirror 50. FIG. 12 shows a time chart of this case. On receiving the timing signal, each driver starts emitting the drive signal. The drive signal has a specific number of pulses at a specific frequency. In the case of FIG. 12, the timing signal is generated when a starting edge of one frame is to be projected, and the drive signal is a periodic pulse train. In response to each pulse of the drive signal, a specified voltage is impressed on the light shutter elements which are to emit light.

For the edge portions of an image, the voltage impression on the light shutter elements is carried out with a small pulse width (low duty factor), and for the center portion of the image, the voltage impression on the light shutter elements is carried out with a large pulse width (high duty factor). Consequently, an image with even brightness can be seen. The pulse widths (duty factors) of the drive signal are individually set to specified values such that the image will have entirely even brightness.

Figure 13:
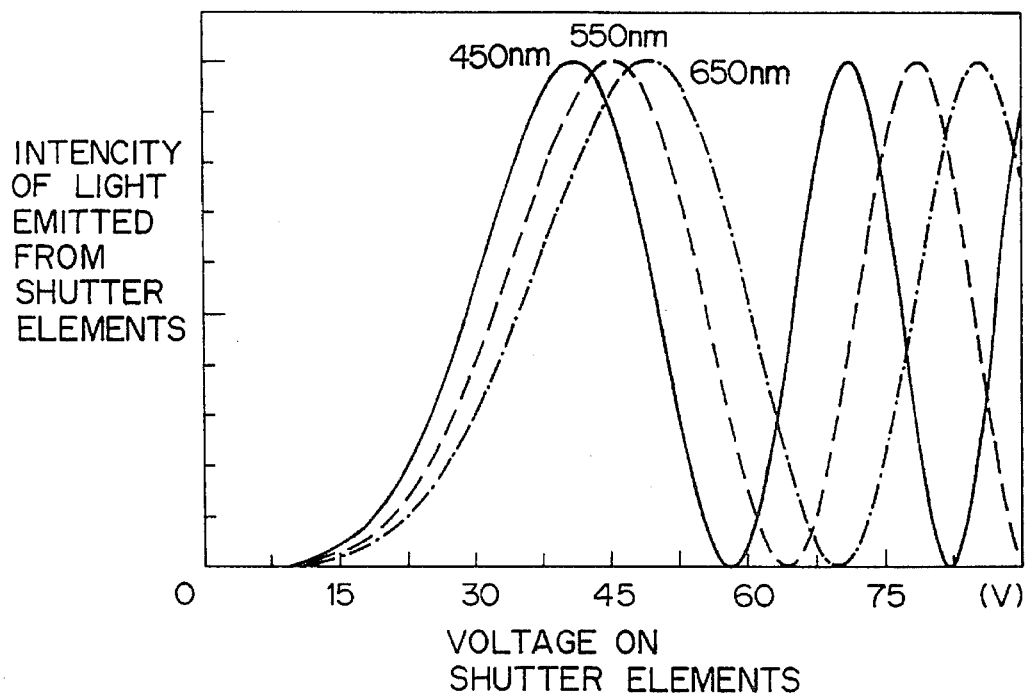
FIG. 13 is a graph showing relation between the intensity of light emergent from the light shutter elements and the voltage impressed thereon.

A second exemplary way is shown by FIG. 13. The second way uses the characteristic of the PLZT light shutter elements that the intensity of light emitted therefrom varies according to the voltage impressed thereon. For the edge portions of an image, the light shutter elements are impressed with a voltage which makes the light shutter elements emit light with a low intensity, desirably, a voltage lower than a half-wave voltage, and for the center portion of the image, the light shutter elements are impressed with a voltage which makes the light shutter elements emit light with a high intensity, desirably, the half-wave voltage. The voltages impressed on the light shutter elements in response to the pulses of the drive signal are individually set to proper values such that the image will have entirely even brightness.

A third exemplary way is varying the intensity of light incident to the light shutter elements, that is, the intensity of light emitted from the light source, in accordance with the scan angle of the scanning mirror 50. While the scanning mirror 50 vibrates through scan angles where the edge portions of an image are formed, the light source is controlled to emit light with a low intensity, and while the scanning mirror 50 vibrates through scan angles where the center portion of the image is formed, the light source is controlled to emit light with a high intensity. For example, if the scanning mirror 50 vibrates at a frequency of 30Hz and the timing signal is generated at a frequency of 60Hz, the light emission from the light source with a low intensity and with a high intensity should be repeated at a frequency of 60Hz. More specifically, the halogen lamps 11, 21 and 31 are impressed with voltages at a frequency of 60Hz in synchronization with the send of the timing signal to the respective optical heads 10, 20 and 30, and thereby, the image will have entirely even brightness.

Figure 14:
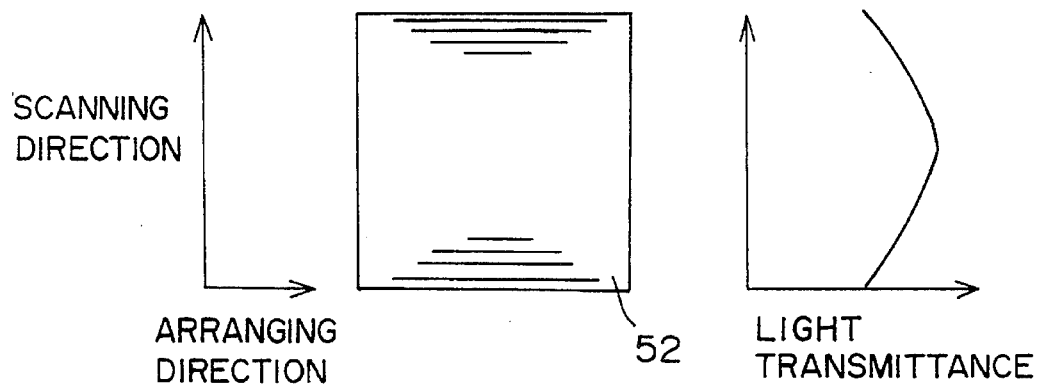
FIG. 14 is a chart showing a transmittance distribution filter and variations in the light transmittance with respect to a scanning direction of the scanning mirror.

A fourth exemplary way is using a transmittance distribution filter 52 indicated with an alternate long and two short dashes line in FIG. 1. The display system of the first embodiment is generally used for head mount display. In the head mount display, since the eye point is substantially fixed, a two-dimensional image appears in a fixed position at a fixed angle to the eyes. In the system, the transmittance distribution filter 52 is provided in front of the eyes. The transmittance distribution filter 52 has a low light transmittance toward a light which is reflected by the scanning mirror 50 at edge portions and is incident to the eyes at large angles thereto, and has a high light transmittance toward a light which is reflected in the center portion of the scanning mirror 50. Thereby, the image can be seen to have entirely even brightness. The light transmittance of the transmittance distribution filter 52 is shown by FIG. 14.

The transmittance distribution filter 52 may be provided not only in front of the eyes as shown in FIG. 1 but also between the magnifying lens 43 and the scanning mirror 50 or between the dichroic mirror 42 and the magnifying lens 43. Additionally, it is possible to provide three transmittance distribution filters between the optical heads 10 and the dichroic mirror 42, between the optical head 20 and the dichroic mirror 41 and between the optical head 30 and the dichroic mirror 41 respectively. In tills case, the average transmittance off each transmittance distribution filter can be set to any value, and thereby, the color balance can be adjusted. Further, instead of providing the transmittance distribution filter 52, a lens which also has a transmittance distributing function can be used as the magnifying lens 43. By such a magnifying lens, the reflectance of the scanning mirror 50 can be altered in accordance with the scan angle, and thus, the magnifying lens brings the same effect as the transmittance distribution filter.

The above description referring to FIG. 4 is about the inaccurate combination of the three color images with respect to the scanning direction (vertical direction of the two-dimensional image) which is caused by the difference of the optical paths of the light signals emitted from the optical heads 10, 20 and 30, and about measures to avoid the problem. The above description referring to FIGS. 10 and 11 is about the compression of the two-dimensional image at the both edge portions with respect to the scanning direction (at upper and lower edge portions of the image), and about measures to avoid the problem.

The following describes a case wherein the light shutter arrays 12, 22 and 32 are out of position with respect to the light shutter element arranging direction (lateral direction of the two-dimensional image), and how to avoid possible problems caused thereby.

Figure 15:
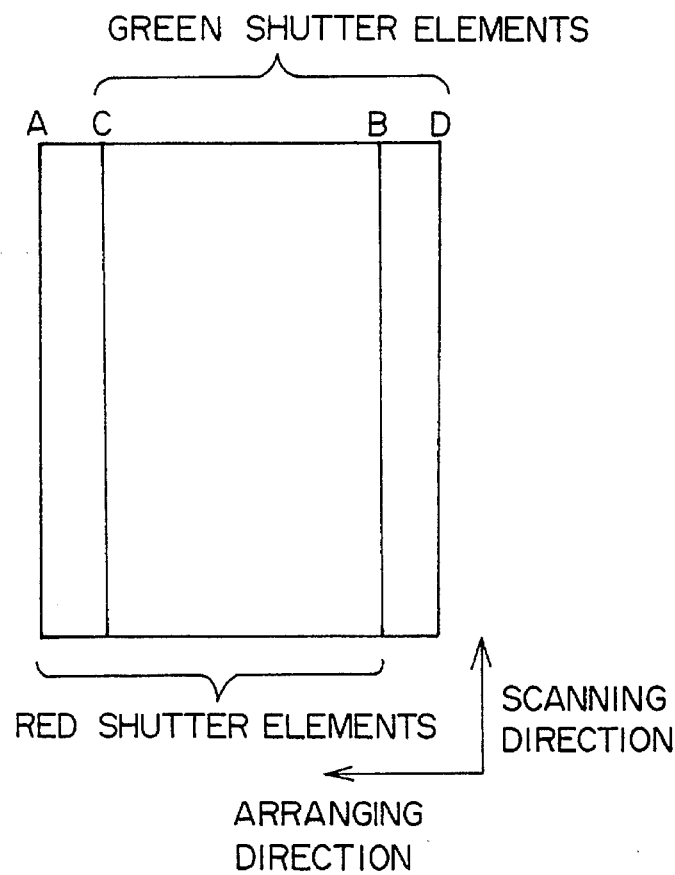
FIG. 15 is an illustration of inaccurate combination of images caused by misalignment of light shutter arrays in a shutter element arranging direction.

FIG. 15 shows inaccurate combination of a red image and a green image in a case wherein the red light shutter array 12 and the green light shutter array 22 are not in alignment with respect to the arranging direction of the light shutter elements. With projection of the light signal emitted from the red light shutter array 12, a red image is seen in a range from a point A to a point B in FIG. 15 with respect to the shutter element arranging direction. With projection of the light signal emitted from the green light shutter array 22, a green image is seen in a range from a point C to a point D in FIG. 15 with respect to the shutter element arranging direction. Although the red image and the green image should be combined exactly one upon the other to Form a correct composite image, in this case the images are out of position by the distance between the point A and the point C, which is equal to the distance between the point B and the point D.

In order to prevent such inaccurate combination of color images, a larger number of shutter elements than the number of picture elements on a line of a two-dimensional image are arranged in a row on each of the light shutter arrays 12, 22 and 32, and image data are rearranged so as to drive the light shutter elements of the respective light shutter arrays in such areas that images of the three colors will be seen exactly one upon another. The rearrangement of image data in the case of FIG. 15 is carried out as follows. The red light shutter array 12 has a row of light shutter elements which is long enough to cover not only the range from the point A to the point B but also the range from the point B to the point D. Since the green image is seen in the range from the point C to the point D, the red image data are rearranged to drive the red light shutter array such that the light shutter elements covering the range from the point A to the point C will not act (or will act without regard to the image data) and that the light shutter elements covering the range from the point C to the point D will act to project the red image data. Thus, the red image and the green image can be combined exactly one upon the other. With such control, images off the three colors can be combined with an accuracy higher than a half of the arranging pitch of the light shutter elements.

Figure 16:
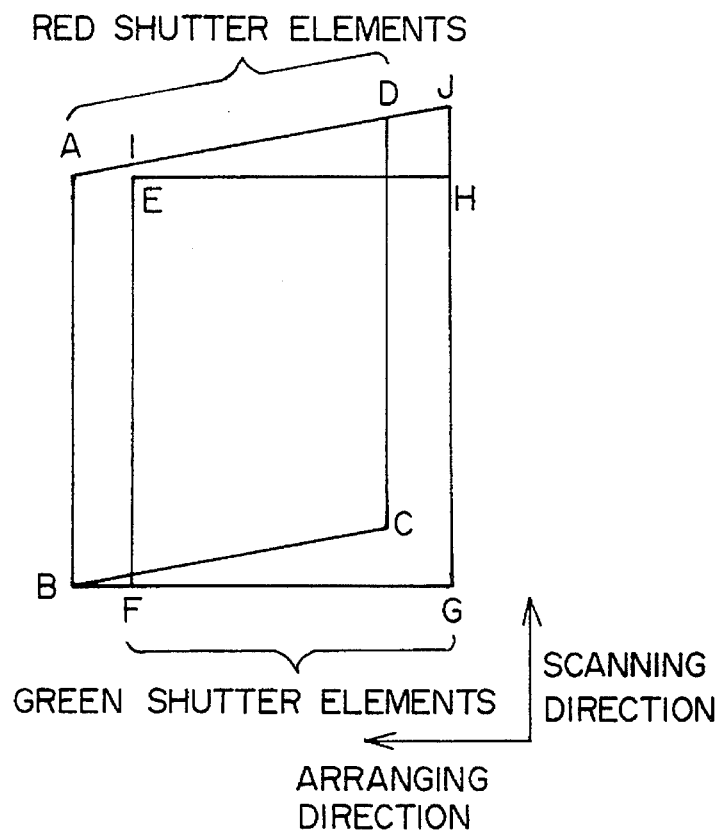
FIG. 16 is an illustration of inaccurate combination of images caused by out-of-parallel of the light shutter arrays.

FIG. 16 shows inaccurate combination of a red image and a green image in a case wherein the light shutter arrays 12 and 22 are further out of parallel. In this case, also, image data are rearranged both with respect to the shutter element arranging direction and with respect to the scanning direction such that images of the three colors will be seen exactly one upon another.

In the case of FIG. 16, the green light shutter array 22 is correctly positioned, that is, positioned exactly perpendicularly to the mirror scanning direction, and a green image is seen in a rectangular area enclosed by points E, F, G and H. However, the red light shutter array 12 is not exactly perpendicular to the mirror scanning direction, and each line of image data is projected in parallel with a line between a point A and D or a line between a point B and C. Additionally, the red light shutter array 12 is not in alignment with the green light shutter array 22 with respect to the shutter element arranging direction, and a red image and a green image are out of position with respect to the shutter element arranging direction by the distance between the point A and the point E. Thus, a red image is seen in a parallelogram area enclosed by points A, B, C and D.

In order to combine the green image and the red image exactly one upon the other on the projection surface, first, the red image data and the red light shutter array 12 need to be controlled in such a manner as described referring to FIG. 15. More specifically, the red light shutter array 12 has a row of light shutter elements which is long enough to cover not only the range from the point A to the point D but also the range from the point D to a point J, and in the case of FIG. 16, the light shutter elements covering the range from a point I to the point J are driven for projection of the red image data. For the projection, the red image data are rearranged as illustrated in FIG. 17. For example, data in an address 1-*a* are relocated to an address 4-*b*, data in an address 2-*a* are relocated to an address 5-*b*, and data in an address 1-*b* are relocated to an address 4-*c*. In this way, the red image data to be sent to the light shutter elements are rearranged in accordance with the misaligning condition of the red light shutter array 12 with the green light shutter array 22. With the rearrangement of the red image data, the red image will be seen in the area enclosed by the points E, F, G and H, and the red image and the green image will be combined exactly one upon the other. Further, preferably, all the light shutter arrays 12, 22 and 32 each have a row of light shutter elements which is long enough to cover the range from the point A to the point J so that any of the red, green and blue image data can be subjected to the rearrangement.

As already mentioned, the drivers 62, 63 and 64 each have circuit composition as shown by FIG. 3, and with the circuit composition, the compression of images occurring in the case of FIG. 10 and the inaccurate combination of shown by FIGS. 15 and 16 can be prevented. The line frequency generating circuit 72 generates a drive pulse signal For driving the light shutter elements. The circuit 72 is stored with a time required for one cycle of scanning (clock frequency) and generates the pulse signal in accordance with the clock frequency. The drive pulse signal has irregular wavelengths as indicated with the time t in FIG. 11, and this is to prevent the compression of an image. The line frequency generating circuit 72 starts sending the drive pulse signal on receiving the timing signal from the timing signal generating circuit 65. Tile timing signal is sent to the drivers 62, 63 and 64 separately when the scanning mirror 50 comes to scan angles specified for the respective drivers 62, 63 and 64.

The memory control circuit 73 rearranges the image data sent from the A/D converter 71 and transmits the rearranged image data to the image memory 74. The rearrangement of the image data is to prevent possible problems as shown by FIGS. 15 and 16 caused by misalignment among the light shutter arrays 12, 22 and 32. The amounts of out-of-position of the light shutter arrays 12, 22 and 32 from the respective right positions are figured out, and rearranging patterns are determined for the respective color image data accordingly. FIG. 17 shows an example of such rearranging patterns. The rearranging pattern determined For image data of each color is stored in the memory control circuit 73, and image data serially transmitted thereto are distributed to addresses in accordance with the rearranging pattern.

In the case of FIG. 15, the amounts of out-of-position of a green image and a red image (0 for a green image and the number of picture elements corresponding to the distance between the points A and C for a red image) are stored in the memory control circuits 73 of the respective drivers 62 and 63. Green image data and red image data serially transmitted to the respective memory control circuits 73 are moved by the respective amounts and are stored in the respective image memories 74.

When the display system is assembled, that is, when the shutter elements and the optical system have been fabricated and set in the display system, the amounts of out-of-position of red, green and blue images are figured out, and the image data rearranging patterns for the respective colors are determined. Then, the image data rearranging patterns are stored in a ROM (EEPROM). The storage of the image data rearranging patterns in the ROM may be carried out before or after setting the ROM in the display system.

Figure 18:
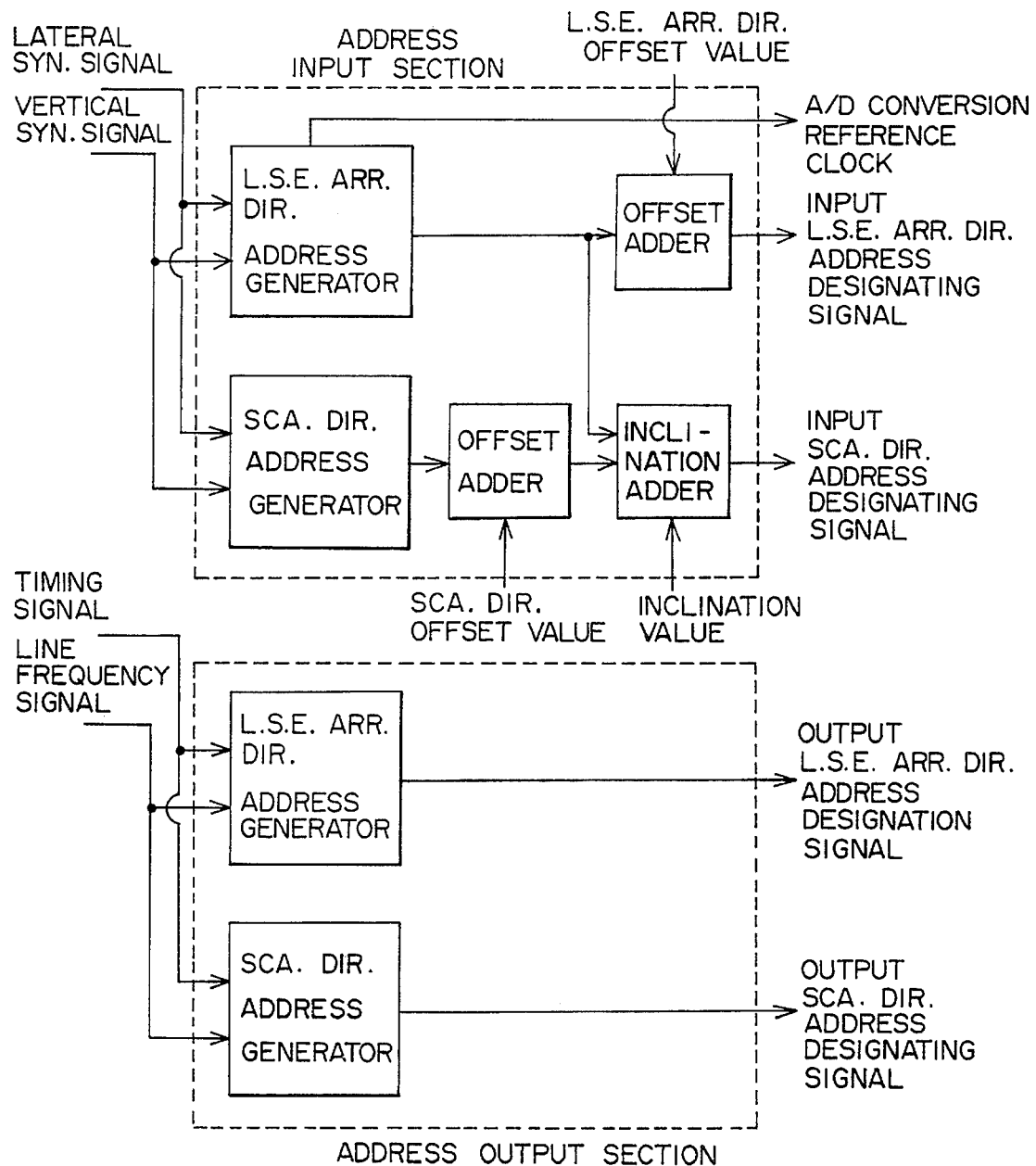
FIG. 18 is a block diagram showing the composition of the memory control circuit shown in FIG. 8.

FIG. 18 shows the composition of the memory control circuit 73. Referring to FIG. 18, a process of rearranging image data to prevent the inaccurate combination of a red image and a green image shown by FIG. 16 is described.

First, digital image data made by the A/D converter 71 (see FIG. 3) are stored in the image memory 74, distributed to addresses (each indicating a position with respect to the shutter element arranging direction and a position with respect to the mirror scanning direction) determined by an address input section (see FIG. 18). For example, in the case off FIG. 17, an offset value in the shutter element arranging direction is determined to be "3", and the offset value is stored in an offset adder beforehand. An offset value in the mirror scanning direction is determined to be "1", and the offfset value is stored in another offset adder beforehand. In an inclination adder, "4" and "1" are stored such that "1" will be added to the address in the mirror scanning direction every four addresses in the shutter element arranging direction. With the setting, as shown in FIG. 17, data in address 1-*a* are moved to address 4-*b* by adding "3" in the shutter element arranging direction and adding "1" in the mirror scanning direction, and the data are stored in the image memory 74 at address 4-*b*. Data in address 4-*a* are moved to address 7-*e* by adding "3" in the shutter element arranging direction and adding "1" and further "1" by order of the inclination adder in the mirror scanning direction, and the data are stored in the image memory 74 at address 7-*e*.

Image data are rearranged and stored in the image memory 74 in the above manner. Then, the image data are read out in accordance with an address designating signal generated by an address output section shown in FIG. 18, and are supplied to the corresponding light shutter elements.

The address designating signal is generated at a specified frequency in accordance with the timing signal and the line frequency signal.

In the composition shown by FIG. 18, the offset adders and the inclination adder are provided in the address input section, and image data are stored in the image memory 74 after rearrangement of the image data. However, it is also possible to provide the offset adders and the inclination adder in the address output section such that image data will be rearranged when the image data are read out from the image memory 74.

In the first embodiment, the scan angle of the scanning mirror 50 is detected by the scan angle detector 68, and when the detected value comes to agree with either one of the values set by the volumes 69R, 69G, and 69B, the timing signal generating circuit 65 sends the timing signal to the corresponding driver 62, 63 or 64. Additionally, the following is another possible way of making the starting point of the three color images agree with each other.

The scan angle detector 68 is so made as to generate a detection signal only when the scan angle of the scanning mirror 50 becomes a single specified angle (for example, 25 degrees). The timing signal generating circuit 65, after receiving the detection signal, sends the timing signal to the drivers 62, 63 and 64 separately with different predetermined time lags. In this case, the volumes 69R, 69G, 69B are used to set the time lags between the time of receiving the detection signal and the times of sending the timing signal to the be respective drivers 62, 63 and 64.

Figure 8:
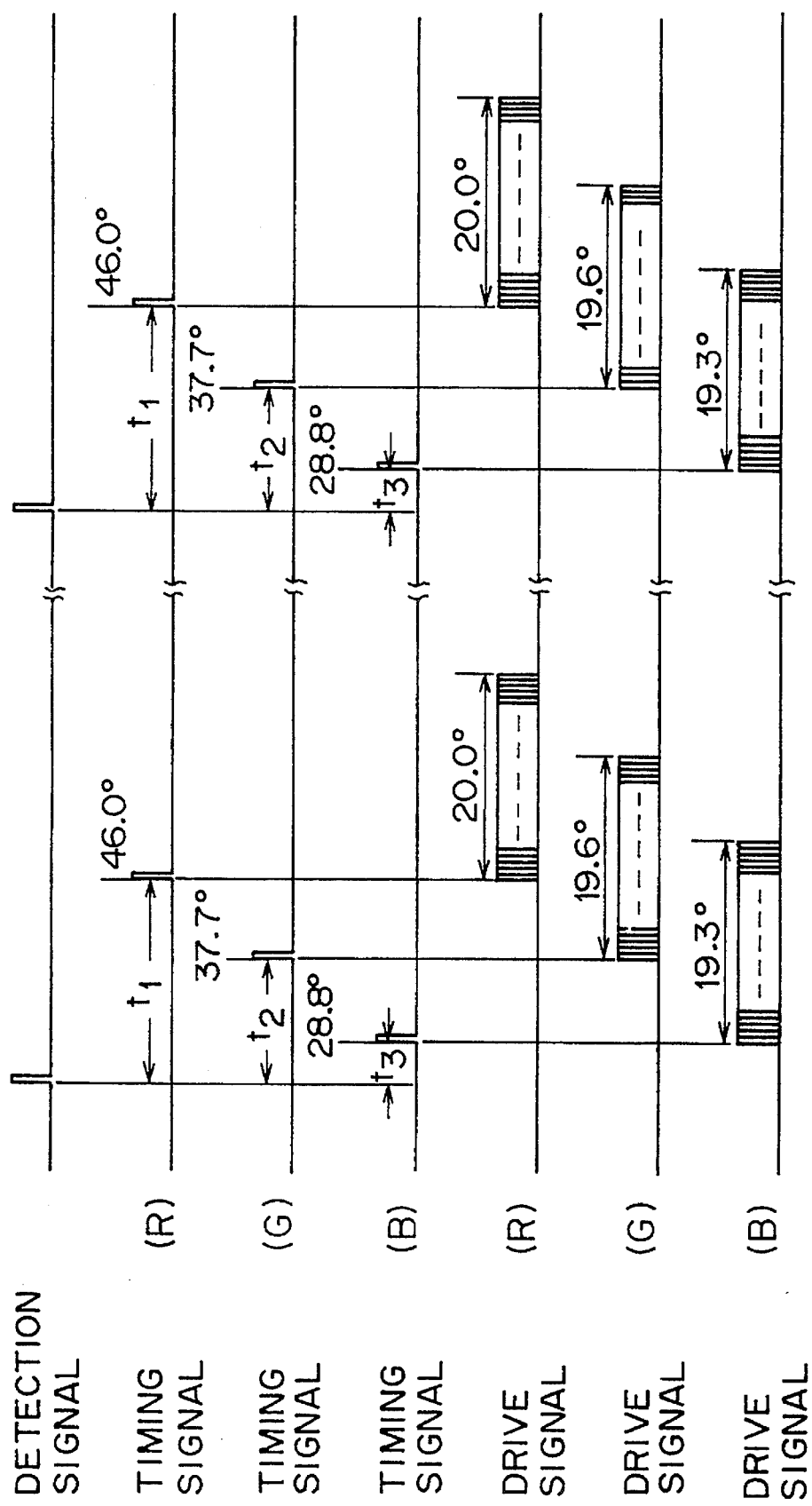
FIG. 8 is a time chart showing another example of action timing of the drivers of the optical heads.

FIG. 8 is a time chart which shows action timing of the drivers 62, 63 and 64 constituted above. The action timing shown by FIG. 8 is for the case of FIG. 4.

The scan angle detector 68 generates the detection signal when the scan angle of the scanning mirror 50 becomes a specified angle (for example, 25 degrees). The timing signal generating circuit 65 receives the detection signal and thereafter sends time timing signal to the drivers 62, 63 and 64 separately with different time lags of $t_1$, $t_2$ and $t_3$ set by the volumes 69R, 69G and 69B. The drivers 62, 63 and 64, when they receive the timing signal, start generating the drive signal individually at the respective drive frequencies set by the respective volumes 75 of the line frequency generating circuit 72. With the different time lags $t_1$, $t_2$ and $t_3$, the first one-line image data of the three colors can be projected in time same place.

After reciprocating for a scan of one frame, the scanning mirror 50 starts reciprocating for a scan of the next one frame. When the scan angle of the scanning mirror 50 becomes the specified angle again, the scan angle detector 68 generates the detection signal, whereby scanning of the next frame is started.

Figure 19:
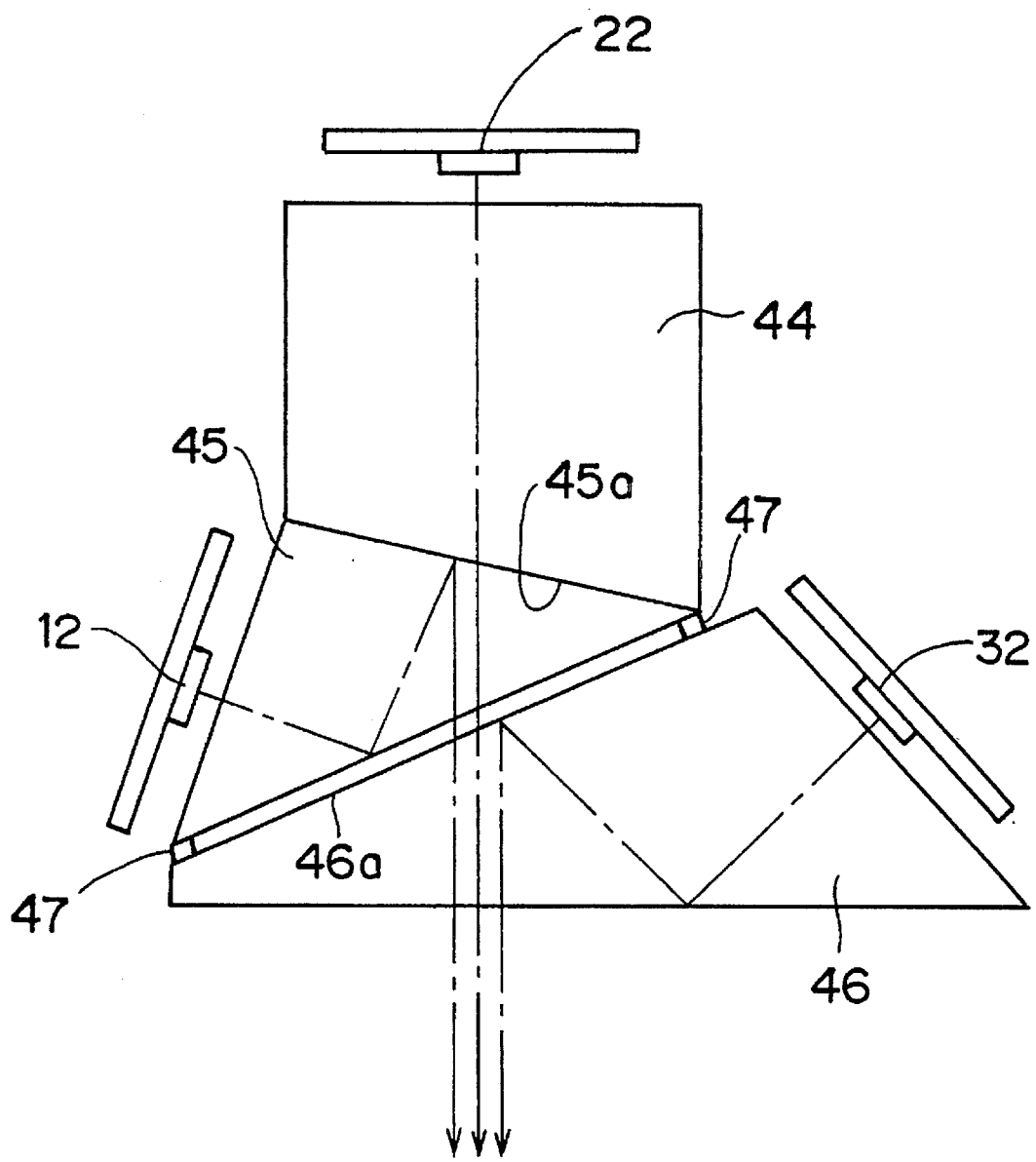
FIG. 19 is an elevational view of an important part of a second embodiment.

FIG. 19 shows a second embodiment.

In the second embodiment, instead of the dichroic mirrors 41 and 42, dichroic prisms 44, 45 and 46 are provided as image combining means. A reflective facet 45a of the dichroic prism 45 reflects red rays, and a reflective facet 46a of the dichroic prism 46 reflects blue rays. Numeral denotes a spacer disposed between the prisms 45 and 46.

Figure 20:
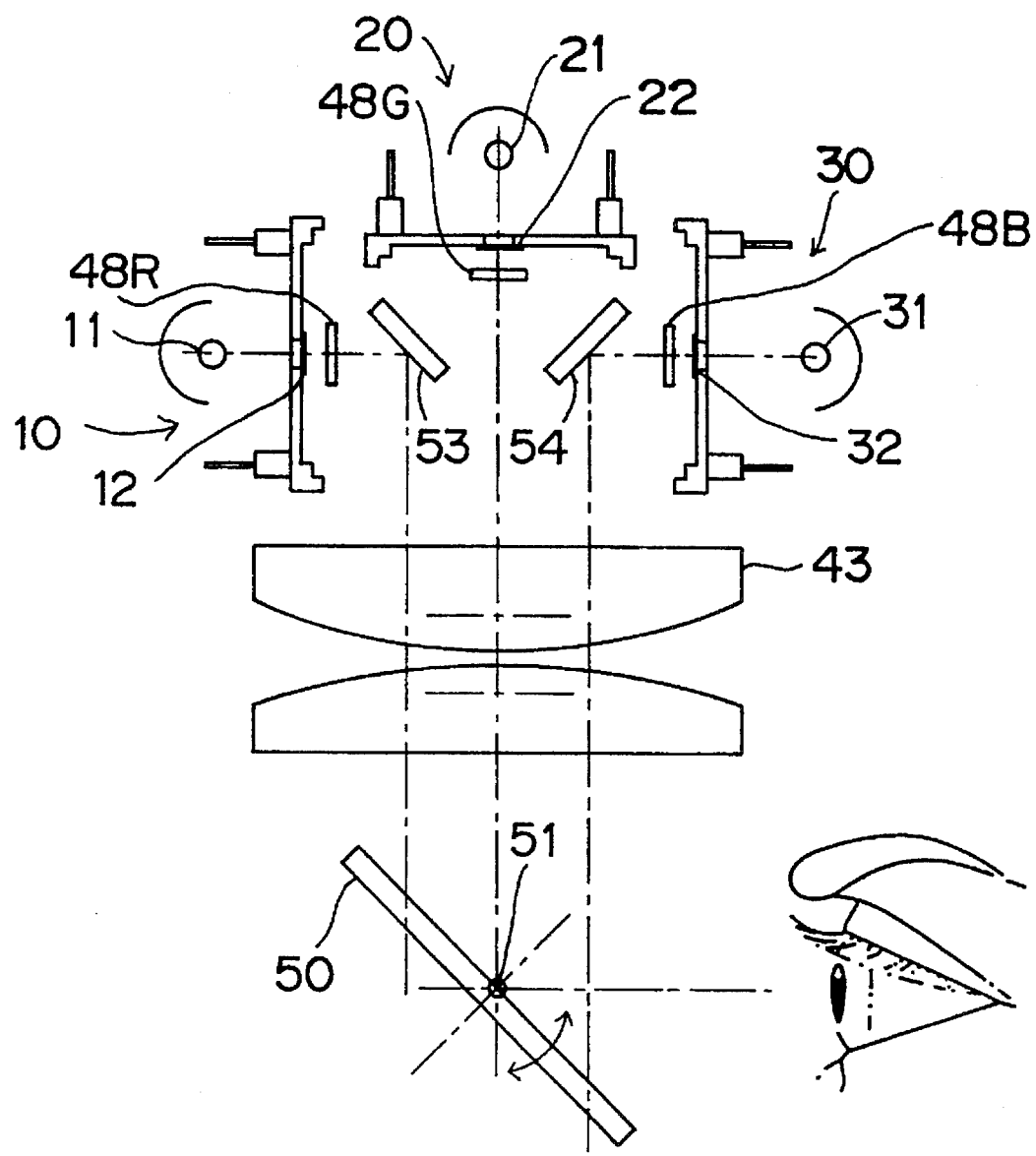
FIG. 20 is an elevational view of a third embodiment showing the general structure.

FIG. 20 shows a third embodiment.

In the third embodiment, neither the dichroic mirrors 41 and 42 nor the dichroic prisms 44, 45 and 46 are provided. Light signals of the three primary colors are converged on the scanning mirror 50 by filters 48R, 486 and 48B, and deflecting mirrors 53 and 54. White lights are emitted from the halogen lamps 11, 21 and 31, and the lights partly pass through the respective light shutter arrays 12, 22 and 32. Concerning the light emergent from the light shutter array 12, only red rays pass through the filter 48R, are deflected by the mirror 53 and are incident to the scanning mirror 50. Concerning the light emergent from the light shutter array 22, only green rays pass through the filter 48G and are incident to the scanning mirror 50 directly. Concerning the light emergent from the light shutter array 32, only blue rays pass through the filter 48B, are deflected by the mirror 54 and are incident to the scanning mirror 50.

In the third embodiment, the accuracy of combination of the three color images on the scanning mirror 50 depends on positioning of the reflective mirrors 53 and 54, especialy angle-setting thereof. Thus, in the third embodiment, control for accurate combination of the three color images is easy.

Figure 21:
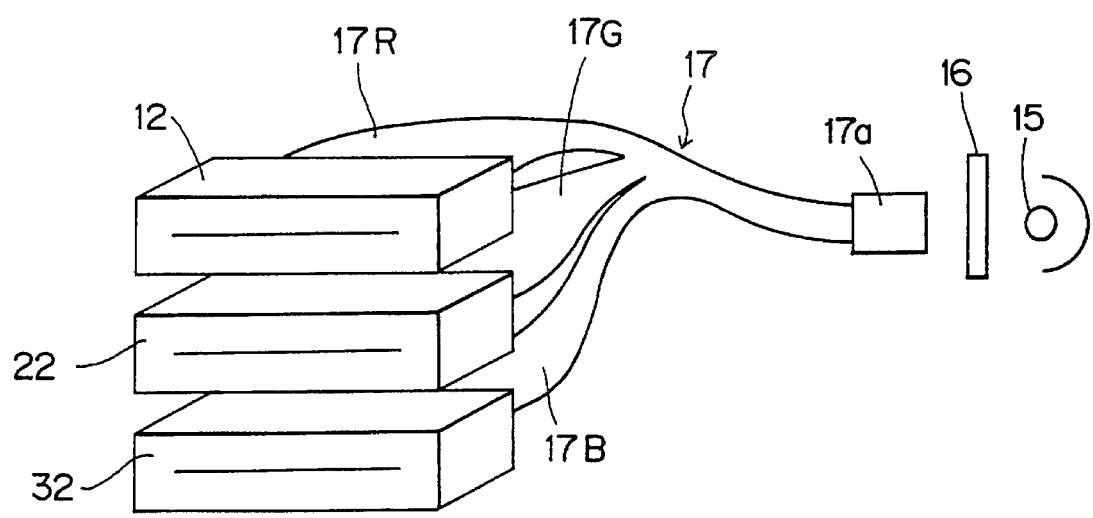
FIG. 21 is a perspective view of an important part of a fourth embodiment.

FIG. 21 shows a fourth embodiment.

In the fourth embodiment, the light shutter arrays 12, 22 and 32 commonly use a halogen lamp 15 as the light source. A light emitted from the halogen lamp 15 passes through an infrared filter 16 and is incident to a light incident portion 17a of an optical fiber array 17. The optical fiber array 17 has three light emergent portions 17R, 17G and 17B, which are connected with the red light shutter array 12, the green light shutter array 22 and the blue light shutter array 32 respectively. The light shutter arrays 12, 22 and 32 are disposed in the positions shown in FIG. 1, FIG. 19 or FIG. 20.

Although the present invention has been described in connection with the preferred embodiments above, it is to be noted that various changes and modifications are possible to those who are skilled in the art. Such changes and modificaions are to be understood as being within the scope of the invention.

What is claimed is:

1. A projection type display system, comprising:
   a plurality of light signal emitting arrays, each of which has a row of light signal emitting elements;
   a plurality of driving circuits provided for the respective light signal emitting arrays to drive the light signal emitting arrays individually, drive frequencies for the respective light signal emitting arrays being different from each other; and
   a scanner which forms a two-dimensional image on a projection surface by scanning a linear light signal emitted from each of the light signal emitting arrays;
   wherein time durations required for each of the light signal emitting arrays to form a frame of a two dimensional image are different from each other.

2. A projection type display system as claimed in claim 1, wherein each of the driving circuits has an adjuster which adjusts the drive frequency.

3. A projection type display system as claimed in claim 2, further comprising:
   a controller which sends start signals to the driving circuits separately;
   a plurality of second adjusters which adjust timings of sending the start signals to the driving circuits;
   wherein each of the driving circuits starts driving the corresponding light signal emitting array responsive to the start signal.

4. A projection type display system as claimed in claim 1, further comprising a light signal combiner which is disposed in an optical path between the light signal emitting arrays and the scanner.

5. A projection type display system as claimed in claim 4, wherein the light signal combiner is a dichroic mirror.

6. A projection type display system as claimed in claim 4, wherein the light signal combiner is a dichroic prism.

7. A projection type display system as claimed in claim 1, wherein each of the light signal emitting arrays comprises PLZT.

8. A projection type display system as claimed in claim 1, wherein the driving circuits drive the respective light signal emitting arrays in accordance with red image data green image data and blue image data respectively.

9. A projection type display system, comprising:
   a plurality of light signal emitting arrays, each of which has a row of light signal emitting elements;
   a plurality of driving circuits provided for the respective light signal emitting arrays to drive the light signal emitting arrays individually in accordance with image data transmitted from an external appliance;
   a scanner which forms a two-dimensional image on a projection surface by scanning a linear light signal emitted from each of the light signal emitting arrays;
   a detector which detects a scan angle of the scanner;
   a controller which sends start signals to the driving circuits separately based on detection of the detector; and
   adjusters which are manually operatable to change timings of sending the start signals to the driving circuits;
   wherein each of the driving circuits starts driving the corresponding light signal emitting array on receiving the start signal.

10. A projection type display system as claimed in claim 9, wherein the driving circuits drive the respective light signal emitting arrays at different drive frequencies specified for the respective light signal emitting arrays.

11. A projection type display system as claimed in claim 10, wherein each of the driving circuits has a second adjuster which adjusts the drive frequency.

12. A projection type display system as claimed in claim 9, further comprising a light signal combiner which is disposed in an optical path between the light signal emitting arrays and the scanner.

13. A projection type display system as claimed in claim 12, wherein the light signal combiner is a dichroic mirror.

14. A projection type display system as claimed in claim 12, wherein the light signal combiner is a dichroic prism.

15. A projection type display system as claimed in claim 9, wherein each of the light signal emitting arrays comprises PLZT.

16. A projection type display system as claimed in claim 9, wherein the driving circuits drive the respective light signal emitting arrays in accordance with red image data, green image data and blue image data respectively.

17. A projection type display system comprising:
   a plurality of light signal emitting arrays, each of which has a row of light signal emitting elements;
   a plurality of driving circuits provided for the respective light signal emitting arrays to drive the light signal emitting arrays individually in accordance with image data transmitted from an external appliance;
   a scanner which forms a two-dimensional image on a projection surface by scanning a linear light signal emitted from each of the light signal emitting arrays;
   a detector which detects a scan angle of the scanner;
   a controller which sends start signals to the driving circuits separately based on values set in the respective driving circuits and detection of the detector; and
   a plurality of adjusters, which are provided for the respective driving circuits, for manually adjusting drive frequencies at which the driving circuits drive the respective light signal emitting arrays.

18. A projection type display system as claimed in claim 17, further comprising a light signal combiner which is disposed in an optical path between the light signal emitting arrays and the scanner.

19. A projection type display system as claimed in claim 18, wherein the light signal combiner is a dichroic mirror.

20. A projection type display system as claimed in claim 18, wherein the light signal combiner is a dichroic prism.

21. A projection type display system as claimed in claim 17, wherein each of the light signal emitting arrays comprises PLZT.

22. A projection type display system as claimed in claim 17, wherein the driving circuits drive the respective light signal emitting arrays in accordance with red image data, green image data and blue image data respectively.

23. A projection type display system comprising:
  at least one light signal emitting array which has a row of light signal emitting elements;
  a driving circuit which drives the light signal emitting array in accordance with image data;
  a scanner which forms a two-dimensional image on a projection surface by scanning a linear image signal emitted from the light signal emitting array; and
  a light intensity regulator which unities intensity distribution of light on the projection surface with respect to a scanning direction by the scanner.

24. A projection type display system as claimed in claim 23, wherein the light intensity regulator is a filter which has varying light transmittances from portion to portion with respect to the scanning direction.

25. A projection type display system as claimed in claim 23, further comprising a light source, wherein:
  the driving circuit drives the light emitting array so as to modulate a light emitted from the light source; and
  the light intensity regulator regulates the intensity of light emitted from the light source.

26. A projection type display system as claimed in claim 23, wherein:
  the driving circuit turns on and off the light signal emitting elements individually by impressing voltages on the light signal emitting elements; and
  the light intensity regulator regulates the voltages to be impressed on the light signal emitting elements.

27. A projection type display system, comprising:
  a plurality of light signal emitting arrays, each of which has a row of light signal emitting elements;
  a plurality of driving circuits provided for the respective light signal emitting arrays to drive the light signal emitting arrays individually in accordance with image data;
  a scanner which forms a two-dimensional image on a projection surface by scanning a linear light signal emitted from each of the light signal emitting arrays; and
  a plurality of image data controllers, each of which is connected to each of the respective driving circuits, for controlling transmittance of the image data based on a predetermined parameter specified for the corresponding driving circuit so as to correct inaccurate combinations of two-dimensional images with respect to a direction in which the row of the light emitting elements extends.

28. A projection type display system as claimed in claim 27, wherein each row of light signal emitting elements has a predetermined length in a direction in which the rows are positioned that is greater than a length of a two-dimensional image formed on a projection surface in a direction corresponding to the direction of the rows.

29. An projection type display system as claimed in claim 27, wherein each of the image data controllers has an EEPROM which is stored with the parameter.

30. A projection type display system, comprising:
  a plurality of light signal emitting arrays, each of which has a row of light signal emitting elements;
  a plurality of driving circuits provided for the respective light signal emitting arrays to drive the light signal emitting arrays individually in accordance with image data;
  a scanner which forms a two-dimensional image on a projection surface by scanning a linear light signal emitted from each of the light signal emitting arrays; and
  a plurality of image data controllers, each of which is connected to each of the driving circuits, for controlling transmittance of the image data based on a parameter specified for the corresponding driving circuit so as to correct inaccurate combinations of two-dimensional images which result from the light signal emitting arrays not being parallel with each other.

31. A projection type display system as claimed in claim 30, wherein each of the image data controllers has an EEPROM which is stored with the parameter.

32. A projection type display system comprising:
  a plurality of light signal emitting arrays, each of which has a row of light signal emitting elements;
  a plurality of driving circuits provided for the respective light signal emitting arrays to drive the light signal emitting arrays at different start timings and at different drive frequencies;
  a scanner which forms a two-dimensional image on a projection surface by scanning a linear light signal emitted from each of the light signal emitting arrays; and
  a plurality of adjusters provided for the respective driving circuits to manually adjust the start timings of the respective driving circuits.

33. A projection type display system as claimed in claim 32, further comprising a plurality of second adjusters provided for the respective driving circuits to adjust and set the drive frequencies of the driving circuits.

34. A projection type display system comprising:
  a plurality of light signal emitting arrays, each of which has a row of light signal emitting elements;
  a plurality of driving circuits provided for the respective light signal emitting arrays to drive the light signal emitting arrays at different start timings and at different drive frequencies;
  a scanner which forms a two-dimensional image on a projection surface by scanning a linear light signal emitted from each of the light signal emitting arrays; and
  a plurality of adjusters provided for the respective driving circuits to manually adjust the drive frequencies of the respective driving circuits.

35. A projection type display system as claimed in claim 34, further comprising a plurality of second adjusters provided for the respective driving circuits to adjust and set the start timings of the respective driving circuits.

36. A projection type display system comprising:

a light signal emitting array which has a row of light signal emitting elements;

a driving circuit which is connected with said light signal emitting array, said driving circuit driving said light signal emitting array at a drive frequency;

a scanner which is disposed in an optical path of light signals emitted from said light signal emitting array to generate two-dimensional image on a projection surface; and a controller which is manually operatable to change the drive frequency.

37. A projection type display system comprising:

a light signal emitting array which has a row of light signal emitting elements;

a driving circuit which is connected with said light signal emitting array;

a scanner which is disposed in an optical path of light signals emitted from said light signal emitting array to generate two-dimensional image on a projection surface;

a detector which detects a scan angle of said scanner;

a controller which sends a start signal to said driving circuit, said driving circuit starting drive of the light signal emitting array based on receiving the start signal; and an adjuster which is manually operatable to change timing of sending the start signal to the driving circuit.

38. A projection type display system comprising:

a plurality of light signal emitting arrays, each of which has a row of light signal emitting elements;

a plurality of driving circuits provided for the respective light signal emitting arrays to drive the light signal emitting arrays individually at different drive frequencies specified for the respective light signal emitting arrays;

a scanner which forms a two-dimensional image on a projection surface by scanning a linear light signal emitted from each of the light signal emitting arrays;

a dichroic mirror which is disposed in an optical path between the light signal emitting arrays and the scanner;

a detector which detects a scan angle of the scanner; and a controller which sends start signals to the driving circuits separately based on detection of the detector;

wherein each of the driving circuits starts driving the corresponding light signal emitting array on receiving the start signal.

39. A projection type display system comprising:

a plurality of light signal emitting arrays, each of which has a row of light signal emitting elements;

a plurality of driving circuits provided for the respective light signal emitting arrays to drive the light signal emitting arrays individually at different drive frequencies specified for the respective light signal emitting arrays;

a scanner which forms a two-dimensional image on a projection surface by scanning a linear light signal emitted from each of the light signal emitting arrays;

a dichroic prism which is disposed in an optical path between the light signal emitting arrays and the scanner;

a detector which detects a scan angle of the scanner; and a controller which sends start signals to the driving circuits separately based on detection of the detector;

wherein each of the driving circuits starts driving the corresponding light signal emitting array on receiving the start signal.

40. A projection type display system comprising:

a plurality of light signal emitting arrays, each of which has a row of light signal emitting elements made of PLZT;

a plurality of driving circuits provided for the respective light signal emitting arrays to drive the light signal emitting arrays individually at different drive frequencies specified for the respective light signal emitting arrays;

a scanner which forms a two-dimensional image on a projection surface by scanning a linear light signal emitted from each of the light signal emitting arrays;

a detector which detects a scan angle of the scanner; and a controller which sends start signals to the driving circuits separately based on detection of the detector;

wherein each of the driving circuits starts driving the corresponding light signal emitting array on receiving the start signal.

* * * * *